United States Patent
Wright

(10) Patent No.: US 7,197,506 B2
(45) Date of Patent: Mar. 27, 2007

(54) COLLECTION MANAGEMENT SYSTEM

(75) Inventor: Linda Wright, Denver, CO (US)

(73) Assignee: Renar Company, LLC, Denver, CO (US)

( * ) Notice: Subject to any disclaimer, the term of this patent is extended or adjusted under 35 U.S.C. 154(b) by 559 days.

(21) Appl. No.: 10/117,773

(22) Filed: Apr. 5, 2002

(65) Prior Publication Data
US 2002/0165857 A1    Nov. 7, 2002

Related U.S. Application Data

(60) Provisional application No. 60/282,368, filed on Apr. 6, 2001.

(51) Int. Cl.
G06F 17/30 (2006.01)

(52) U.S. Cl. .............. 707/102; 707/1; 707/3; 707/7

(58) Field of Classification Search ............ 707/1–7, 707/100, 103 R–104.1; 700/90, 95, 99, 105, 700/106, 98, 105.106; 704/1, 4, 7, 10; 715/700, 715/733, 738, 764, 781, 804; 717/100, 106, 717/108
See application file for complete search history.

(56) References Cited

U.S. PATENT DOCUMENTS

| | | | | |
|---|---|---|---|---|
| 5,461,698 A * | 10/1995 | Schwanke et al. | ............ | 706/20 |
| 5,835,905 A * | 11/1998 | Pirolli et al. | ............ | 707/3 |
| 5,895,470 A * | 4/1999 | Pirolli et al. | ............ | 707/102 |
| 5,983,237 A * | 11/1999 | Jain et al. | ............ | 707/104.1 |
| 6,208,992 B1 * | 3/2001 | Bruckner | ............ | 707/100 |
| 6,256,627 B1 * | 7/2001 | Beattie et al. | ............ | 707/6 |
| 6,366,908 B1 * | 4/2002 | Chong et al. | ............ | 707/3 |
| 6,370,526 B1 * | 4/2002 | Agrawal et al. | ............ | 707/5 |
| 6,999,963 B1 * | 2/2006 | McConnell | ............ | 707/100 |
| 7,031,554 B2 * | 4/2006 | Iwane | ............ | 707/104.1 |
| 2001/0032029 A1 * | 10/2001 | Kauffman | | |
| 2002/0039101 A1 * | 4/2002 | Fernandez et al. | | |

OTHER PUBLICATIONS

George Lakoff, *Women, Fire, and Dangerous Things*, The University of Chicago Press, Chapter 2, pp. 12-57, 1987.
John R. Taylor, *Linguistic Categorization*, Oxford University Press, 1995.
Julian Barbour, *The End of Time, The Next Revolution of Physics*, Oxford University Press, pp. 16; 39-46; 49-51; and 240, 1999.
George A. Miller, *The Science of Words*, Scientific American Library, New York, preliminary pages, preface and table of contents, 1991.
U.S. Library of Congress, Subject Headings, 4 pgs.
WORDNET, Internet screen shots, 4 pgs.

* cited by examiner

*Primary Examiner*—Debbie M. Le
(74) *Attorney, Agent, or Firm*—Volpe and Koenig, P.C.

(57) ABSTRACT

A method for managing a collection of objects, comprises selecting a property which is common to all of the objects; creating a plurality of exemplar structures, at least one exemplar structure for each object; prototypically categorizing the exemplar structures; and using the exemplar structures to access information regarding said collection. Each exemplar structure comprises an exemplar, which is a good example of the property; a broader term, which provides context to the exemplar; an object identifier, which identifies one of the collection of objects; and at least one attribute, which describes the exemplar.

24 Claims, 20 Drawing Sheets

| ATTRIBUTE / COMBINATION | CHAIR | EXEMPLARS TABLE | MIRROR | STEREO |
|---|---|---|---|---|
| FOUR LEGS | 1 | 1 | | |
| WOOD | 1 | 1 | 1 | |
| METAL | 1 | 1 | | 1 |
| FABRIC | | | | |
| CUSHIONING | | | | |
| GLASS | | 1 | 1 | |
| EXPANDABLE | | | | |
| FRAMED | | | | |
| UNFRAMED | | | | |
| TWO - WAY | | | | |
| SHELF | | | | |
| SELF - STANDING | | | | |
| 17" WIDTH | | | | |
| 6" WIDTH | | | | |
| FOUR LEGS / METAL | 2 | 2 | | |
| FOUR LEGS / WOOD | 2 | 2 | | |
| GLASS / WOOD | | 2 | 2 | |
| METAL / WOOD | 2 | 2 | | |
| FOUR LEGS / METAL / WOOD | 3 | 3 | | |
| TOTAL VALUES | 12 | 15 | 4 | 1 |

FIG. 6E

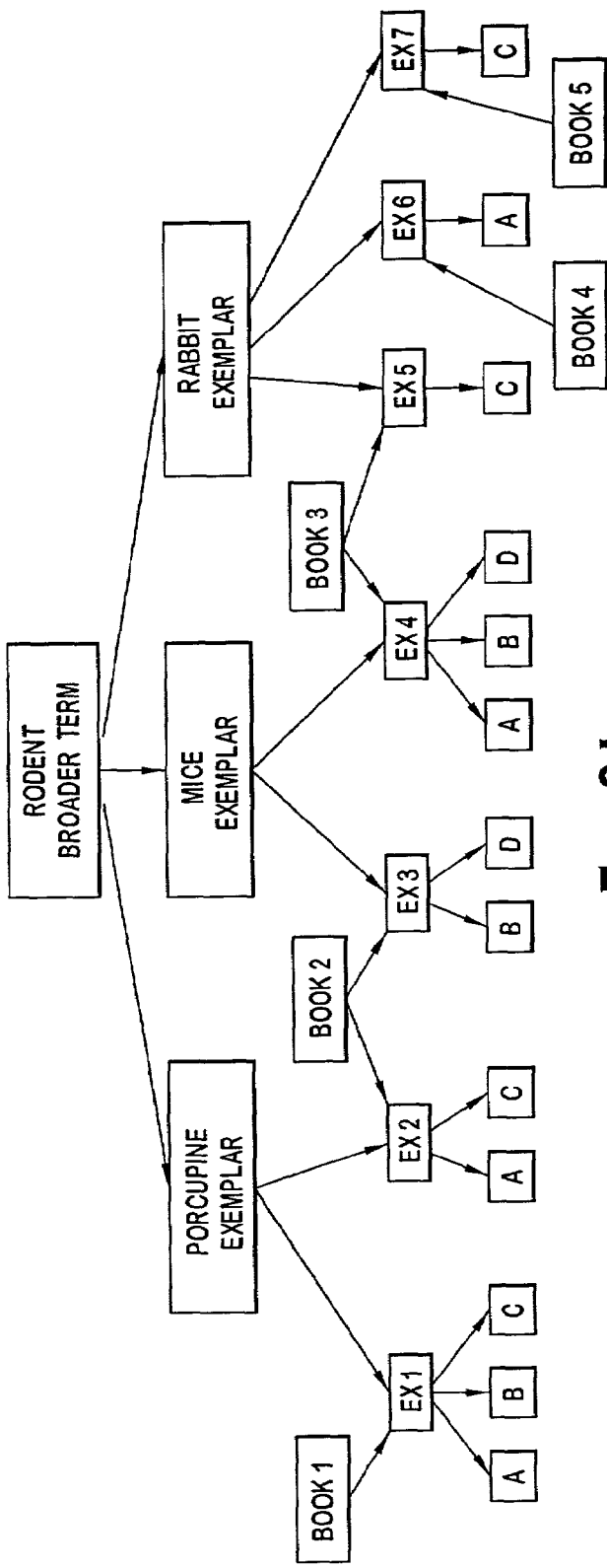

COLLECTION MANAGEMENT SYSTEM

CROSS REFERENCE TO RELATED APPLICATION

This application claims priority to Provisional Application No. 60/282,368, filed Apr. 6, 2001, which application is incorporated herein by reference.

BACKGROUND

The present invention is related to data management systems. More particularly, the present invention is a collection management system that categorizes a group of objects, content or organisms for maximum accessibility. The physical or perceptual properties which are accessed are user defined.

Current data management systems and search engines are able to perform low-level sorts and superficial searches on a collection of data. For example, most search engines receive input from a user in the form of one or more search terms, and the search engine searches websites across the Internet for words which match those search terms. Although Boolean operators may be used to further define searches, ultimately the searches are simple word matching techniques, and classification methods are strictly hierarchical taxonomies built from classical categorization principles.

Terms are words used for some particular thing. Words, however, have a three-sided character: 1) conceptual—the meaning of a word; 2) physical—how to pronounce or read a word; and 3) syntactic—the grammatical context in which a word is used. When a word is spoken, the speaker is essentially unaware of anything but meaning. Yet, the search terms of current data management systems only use the physical side of the character of a word. Word matching and metatag labeling typify this approach. Reliance on the physical properties of a word impoverishes searching and limits data management systems to binary operations, in that either a word form is correct or it is not. Database inquiry is much the same.

Other data management systems attempt to create document summaries by extracting significant phrases via parts-of-speech taggers and simple grammar. Similar to word matching, significant phrases are identified by frequency information in the document or database. This approach concentrates on the syntactic character of a word. However, only when communication becomes distorted or confusing does a speaker pay any attention to grammatical context. A syntactic approach is also binary, in that a word is either correctly used in a sentence or not. Document summary techniques incorporate two sides of a word's character: physical and syntactic.

The simplistic nature of current search engines and data management systems is emphasized by the use and misuse of metatags. Metatags are terms that are used within a web site to increase the likelihood that a search engine will select a particular web site for presenting to the user. Since search engines look for words which match the search terms, those web sites having a higher frequency of matches will be noted as the most relevant of the search results presented to the user. Misuse of metatags occurs when website operators try to "drive" traffic to a website by repeating certain metatags hundreds, or even thousands, of times in order to drive that particular website toward the most relevant of the search results. Often the words used in the metatags bear little or no relation to the websites in which they are implemented. In this manner, search engines are misdirected to present websites which are not responsive to the search terms input by the users.

Categorization attempts to reduce the limitless variations of reality into manageable proportions. Current data management systems use classical theories of categorization to structure a database in terms of necessary and sufficient features for membership. If X is a member of Y, then the properties of X are compared to the essential features of Y. Knowledge of this set of features encompasses what is known of Y.

Classical categorization techniques, however, can be inadequate when required to handle a continuum of information that is not easily categorized. Similar to the current computer file/folder metaphor for desktop organization, classical categories are binary and comprise an all-or-nothing approach. Information is either present or it is not, and everything is potentially available since all information has equal status.

An alternative theory of categorization organizes the world by degree of membership. Known as prototypical categorization, it involves a "criss-crossing network of similarities". Unlike classical categories that are strictly hierarchical, prototype categories have a core and a periphery. Core members share more attributes in common than more marginal members. Ludwig Wittgenstein in *Philosophical Investigations* (1945) anticipated the importance of prototypes in linguistic categorization when he used the metaphor of a "family resemblance" to describe the structure of the category "game", where there is no common set of properties that define a game from a non-game.

Prototypical categories are useful because they more fully exploit the real-world correlation of attributes and are better able to handle a continuum of information. With prototypical categorization, new entries do not cause restructuring of the category system and marginal membership is permitted. Another advantage with prototypical categorization is that prototypes can change over time and are thought to contain cultural dimensions of meaning. Prototypes can be understood in two ways: either as a cluster of core members of a category, (i.e., focal exemplars); or as a representation of the conceptual core of a category. Exemplars are "good examples" of a particular range of something.

A well-known precedent for the usefulness of exemplars is established by color categorization. Humans are capable of seeing 7.5 million discernable color differences. However, approximately 11 universal "focal" colors reference this vast range of color. That is to say, eleven different exemplars, (basic color terms), maximize access to a very large collection.

Studies have investigated color categories in different languages and found that if a person is asked to name the range of a color, for example red, there is cross-language and within-language variability. The same person may even select different shades of red at different times. Such variability supports the notion that the assignment of word meaning is arbitrary.

However, such variability often disappears when a person is asked to select a "good example" of a basic color term. In that case, a high degree of agreement occurs. Therefore, paying attention to the denotational range of a color term highlights the language specificity of the terminology. Eliciting good examples of color terms highlights what is common between languages. These findings cast doubt on the idea that all linguistic signs are arbitrary. Exemplars represent a level of categorization that is cognitively and linguistically more salient than other levels of categorization.

Although current search engines and data management systems adequately operate, (though oversimplified and unrealistic as they may be), these systems are adept at managing discrete data. But reality-as-a-continuum becomes difficult to describe and categorize. The use of exemplars to structure and meaning could provide a powerful advantage over current data management techniques.

SUMMARY

The present invention is a collection management system wherein a group of objects, content, or organisms are categorized for maximum accessibility. That which is accessed, (physical or perceptual properties), is user defined. Whereas current management systems utilize one, or sometimes two sides of a word's character, the present invention uses all three sides: 1) conceptual; 2)physical; and 3)syntactic. The present invention utilizes the conceptual side of a word by constructing meaning instances. The physical side of a word is used to build and navigate exemplar structures. The syntactic side of a word is employed by synonym set tagging and clustering to facilitate categorization and searching.

Similar to the way we speak, the present invention focuses on meaning. Everything else is largely unconscious and operates behind the scenes. The system views meaning as a relative arrangement of instances of common construction, all of which are organized by prototypical categorization. Accordingly, a word constitutes a category that has a core and periphery. The sense of a word is not defined by necessary or sufficient features. Therefore, meaning is not binary but a "criss-crossing network of similarities" that offers perspective beyond a point.

The perspective of the present invention is similar to a unified theory of space/matter. Instead of one kind of thing moving in space (atoms in space), the invention views the world as different instances of one thing. Instances bring themselves into being when a common principle is applied to a collection of many different things, simultaneously becoming one even as they are still different. Each instance is modeled as a structure. The "one thing" is a possible arrangement, a configuration space, of different instances.

Furthermore, the present invention automatically provides strategies for searching and "looking", unlike prior art search mechanisms that only enable browsing, where the user must figure out where to look. All attempts to find desired information within a collection are made extremely accurate and easy.

BRIEF DESCRIPTION OF THE DRAWING(S)

FIG. 6E is a table for S-categorization of the exemplar structures shown in FIGS. 6A–6D.

FIG. 8A is an example of P-categorization for a relative arrangement of meaning instances of a property.

FIG. 8B is a table of the results of P-categorization.

DETAILED DESCRIPTION OF THE PREFERRED EMBODIMENT(S)

Figure 1A:
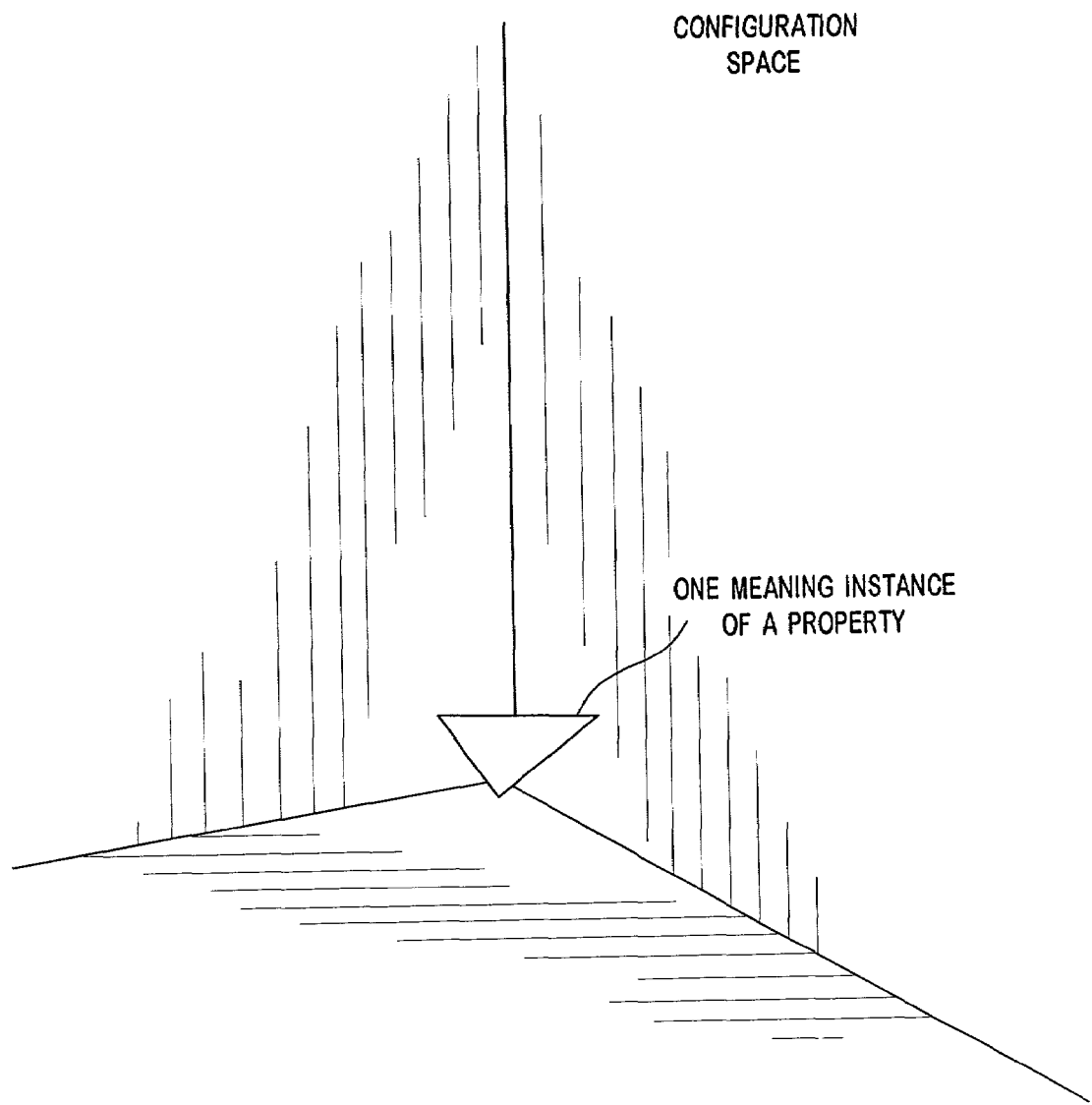
FIG. 1A is a two-dimensional meaning instance of a property.

The present invention will be described with reference to the drawing figures, wherein like numerals represent like elements throughout.

The collection management system of the present invention categorizes a group of objects, content, or organisms, (hereinafter referred to as "objects") for maximum accessibility with regard to a user-defined property. Most likely, the given property is a continuum of information that is hard to categorize.

The collection management system of the present invention views information conceptually as a relative arrangement of "meaning instances" for a given property, called configuration space. A unique arrangement of meaning instances is called a region. Meaning instances may be compared to the development of perspective during the Renaissance. Pre-Renaissance painting was flat. Images occupied one plane, the foreground. With the Renaissance, perspective was developed showing foreground and background. Much more information was delivered by this approach, as does the present invention. Meaning instances deliver perspective.

It should be noted that only two aspects of the present invention require a user to input information into the collection for later retrieval or categorization: 1) construction of exemplar structures; and 2) categorization for onomasiological saliences. Additionally, there are two different kinds of users of the collection management system: 1) "collection administrators" who establish and maintain the collection of objects; and 2) "general users" who access the collection for their information needs. As will be explained in detail hereinafter, the collection administrator builds the exemplar structures and may input a basic level of information for the categorization of onomasiological saliences. General users only input information to be used for categorization of onomasiological saliences. Of course, this does not include inputting of the access term when utilizing the collection management system to access the information managed therein. Accordingly, depending upon the context in which the collection management system is being described herein, the present specification may refer to a user as a collection administrator or a general user.

Figure 1B:
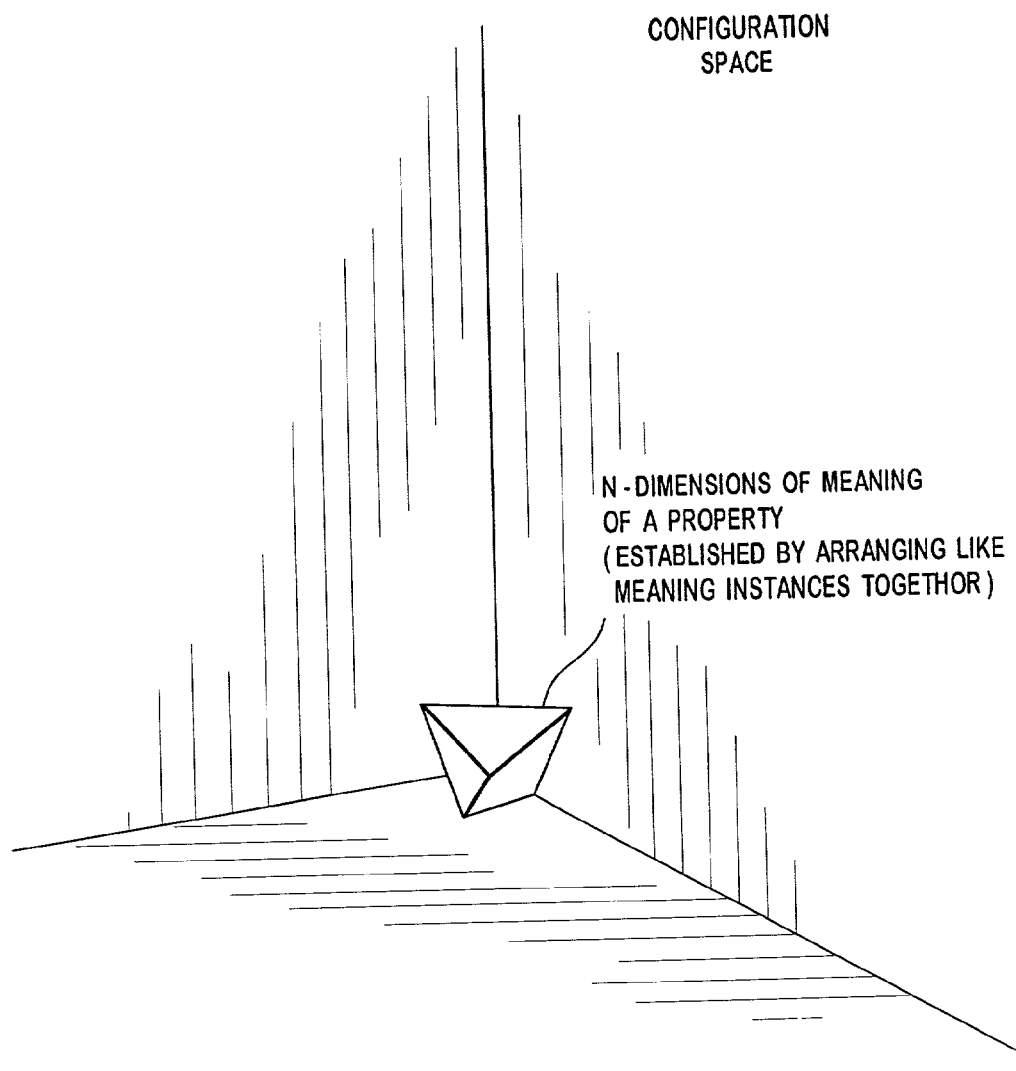
FIG. 1B is N-dimensions of meaning of a property.
Figure 1C:
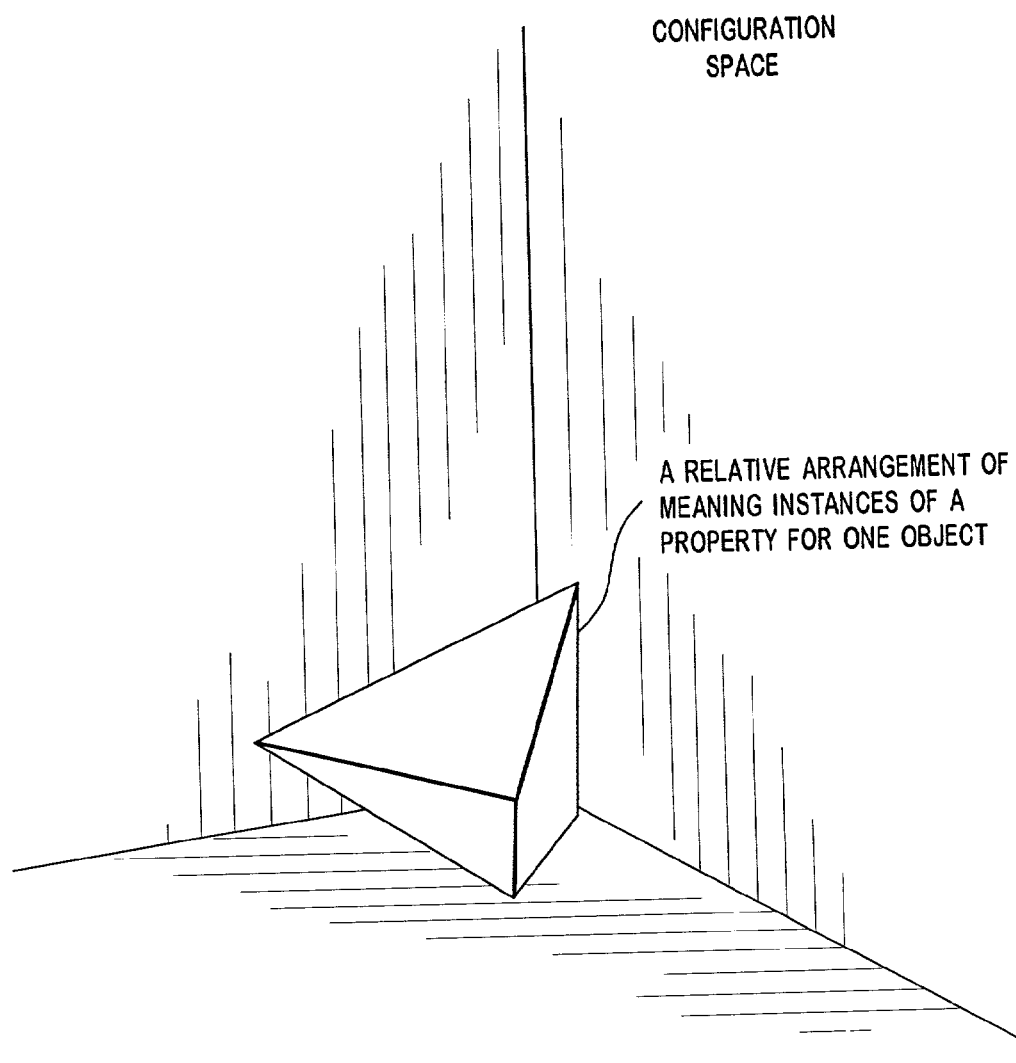
FIG. 1C is a relative arrangement of meaning instances of a property for a single object.
Figure 1D:
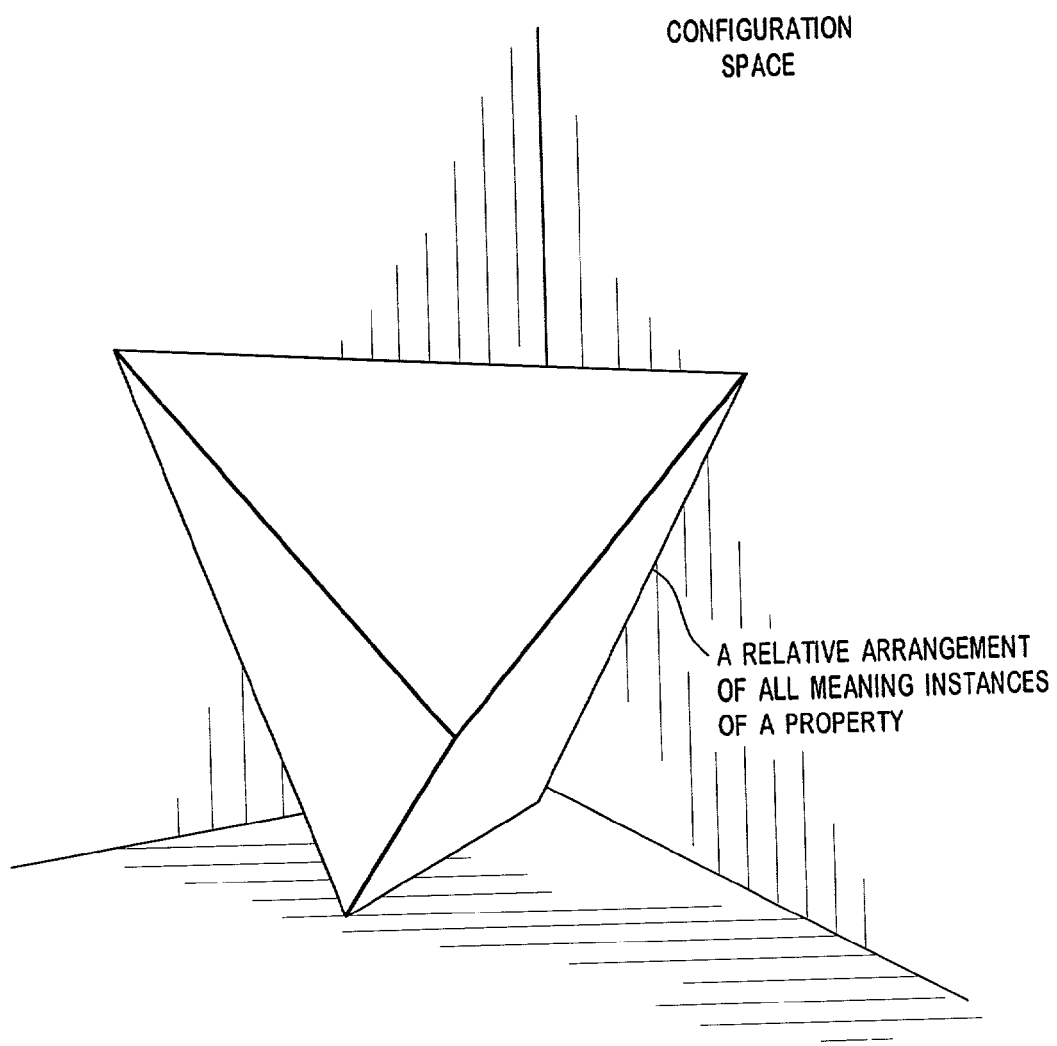
FIG. 1D is a relative arrangement of all meaning instances of a property.

FIG. 1A shows one meaning instance of a property. A meaning instance represents one layer of meaning. FIG. 1B models N-dimensions of meaning that are established by arranging like-meaning instances together. FIG. 1C is a relative arrangement of meaning instances for one object. FIG. 1D is a relative arrangement of meaning instances of a property.

Figure 2A:
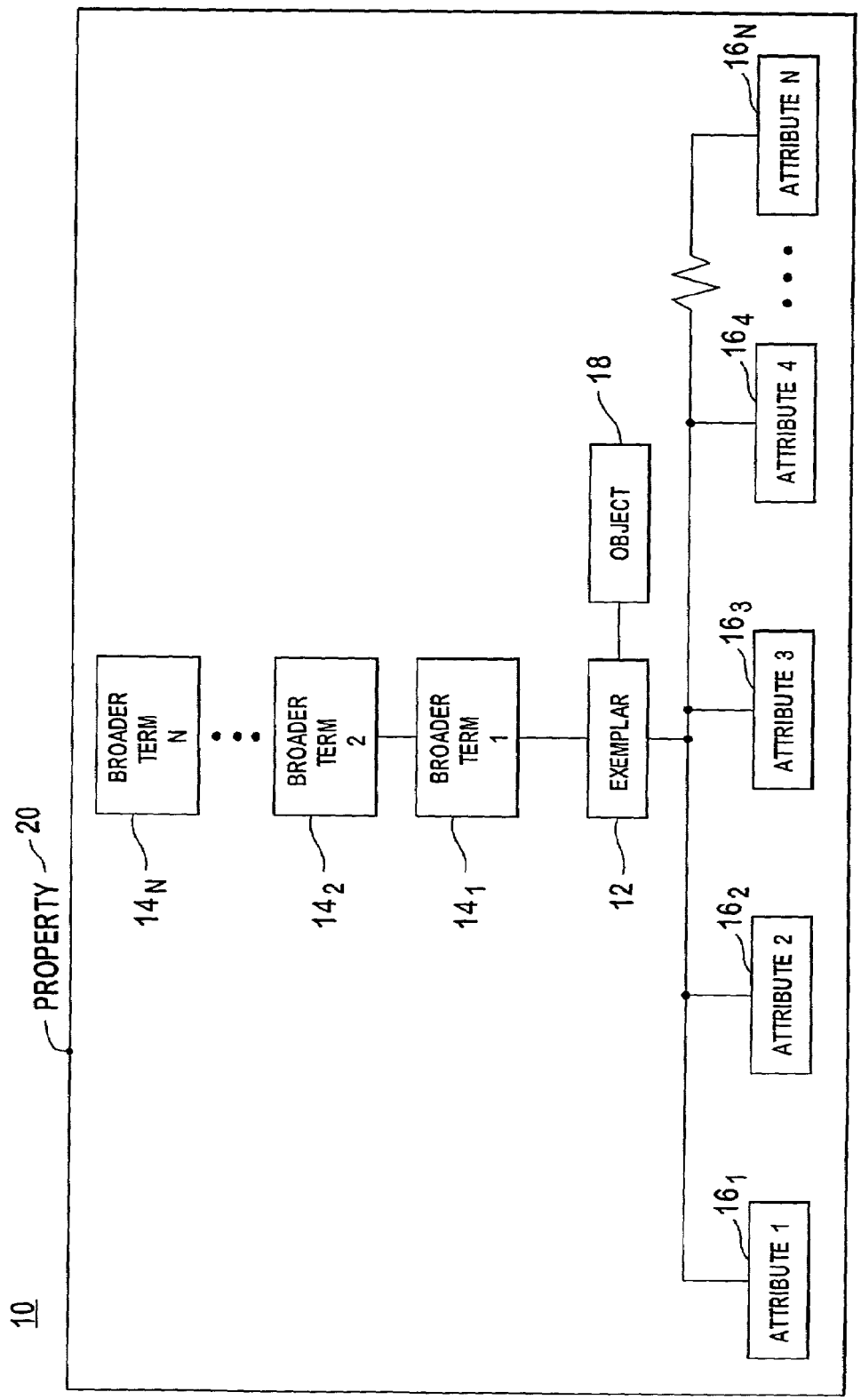
FIG. 2A is an exemplar structure.

Instances of meaning bring themselves into being when prototype theory is applied to many different objects of a collection, simultaneously becoming one property even as they are all different. Each meaning instance is constructed as an exemplar structure 10 as shown in FIG. 2A, using the rules of prototype theory as an organizing principle. Each exemplar structure is built by first associating an exemplar to a meaning instance, setting the exemplar in a specific context, and further defining it by attributes. Once the exemplar structure 10 for a meaning instance has been defined, the collection management system automatically attaches sense and synonym sets to each attribute. In this way, attributes with similar meaning are clustered together for increased productivity.

The exemplar structure 10 shown in FIG. 2A comprises an exemplar 12, which is associated with at least one broader term $14_1$–$14_N$, at least one attribute $16_1$–$16_N$, and an object 18. The exemplar structure 10 constructs "meaning instances" for a given property 20. The exemplar structure is the basic organizational unit of the present invention and is the sole vehicle for inputting information into the collection management system.

Exemplars 12 are essentially "good examples" of the full range of the given property 20. As discussed hereinbefore, since a high degree of agreement occurs when a person is asked to name a "good example" of something, the use of exemplars organizes a collection so that the probable is experienced. Exemplars serve as portals for a large collection of information.

A broader term $14_1$–$14_N$ is used to define the context of an exemplar 12, (i.e. of which category an exemplar 12 is a member). Since many words in English, or any other language, have several different meanings depending upon the context in which the word is used, a broader term $14_1$–$14_N$ is used to place an exemplar in a particular context, and thus establish context for a particular meaning instance.

Each exemplar structure 10 also includes at least one attribute $16_1$–$16_N$. Attributes $16_1$–$16_N$ are the distinguishing features of an exemplar 12, and the dimension by which exemplars 12 are considered similar. An attribute $16_1$–$16_N$ may be attributive (adjective/noun), functional (verb), or part/whole (noun). An attributive attribute $16_1$–$16_N$ states the value of things. A functional attribute $16_1$–$16_N$ describes usage. A part/whole attribute $16_1$–$16_N$ either names a part of something or names the whole of which something is part. Each attribute $16_1$–$16_N$ facilitates agreement on the particular meaning of what is being communicated.

For example, if an exemplar 12 is CHAIR, the attributive attributes $16_1$–$16_N$ may be FOUR-LEGGED, CLOTH, WOOD, PADDED and ARMLESS. Functional attributes $16_1$–$16_N$ for the exemplar CHAIR may be SIT, REST and RECLINE. A part attribute $16_1$–$16_N$ for the exemplar CHAIR may comprise BACK, ARM, LEG and SEAT; whereas a whole attribute $16_1$–$16_N$ may comprise KITCHEN, DINING ROOM, RESTAURANT and BOARD OF DIRECTORS. All types of attributes $16_1$–$16_N$ are important since they provide a dimension of meaning that distinguishes one exemplar 12 from another. All types of attributes $16_1$–$16_N$ may be utilized separately or together in accordance with the present invention.

Attributes $16_1$–$16_N$ and broader terms $14_1$–$14_N$ are indirectly related to each other. The broader term $14_1$–$14_N$ may be associated with attributes $16_1$–$16_N$ that are also shared with other broader terms $14_1$–$14_N$, or the broader term $14_1$–$14_N$ may be associated with attributes $16_1$–$16_N$ that are exclusive to that broader term $14_1$–$14_N$. It should also be noted that two exemplar structures 10 may have the same exemplar 12 and broader term $14_1$–$14_N$ (e.g. FEAR and EMOTION, respectively), whereby a first set of attributes 16 may comprise KILLING and MURDER, and a second attribute 16 set may comprise COERCION, DANGER, DEATH and VIOLENT.

The object 18 associated with the exemplar identifies the particular object for which the exemplar structure 10 was created. For example, if the collection is a collection of books, the object 18 will be a specific book. Alternatively, if the collection is a plurality of drugs, the object 18 will be a specific drug.

The configuration of the exemplar structure 10 provides flexibility and enhances the intelligent search and sorting capabilities of the system. After an exemplar 12 is entered by a user for an object 18, a broader term 14 (or broader term path) must be selected and the attributes 16 associated with the exemplar 12 must be entered. It should be noted that the order of selecting a broader term 14 and entering the attributes 16 is not critical. It is acceptable to perform either step first. This will be explained with reference to an example shown in FIGS. 2B–2D.

Figure 2B:
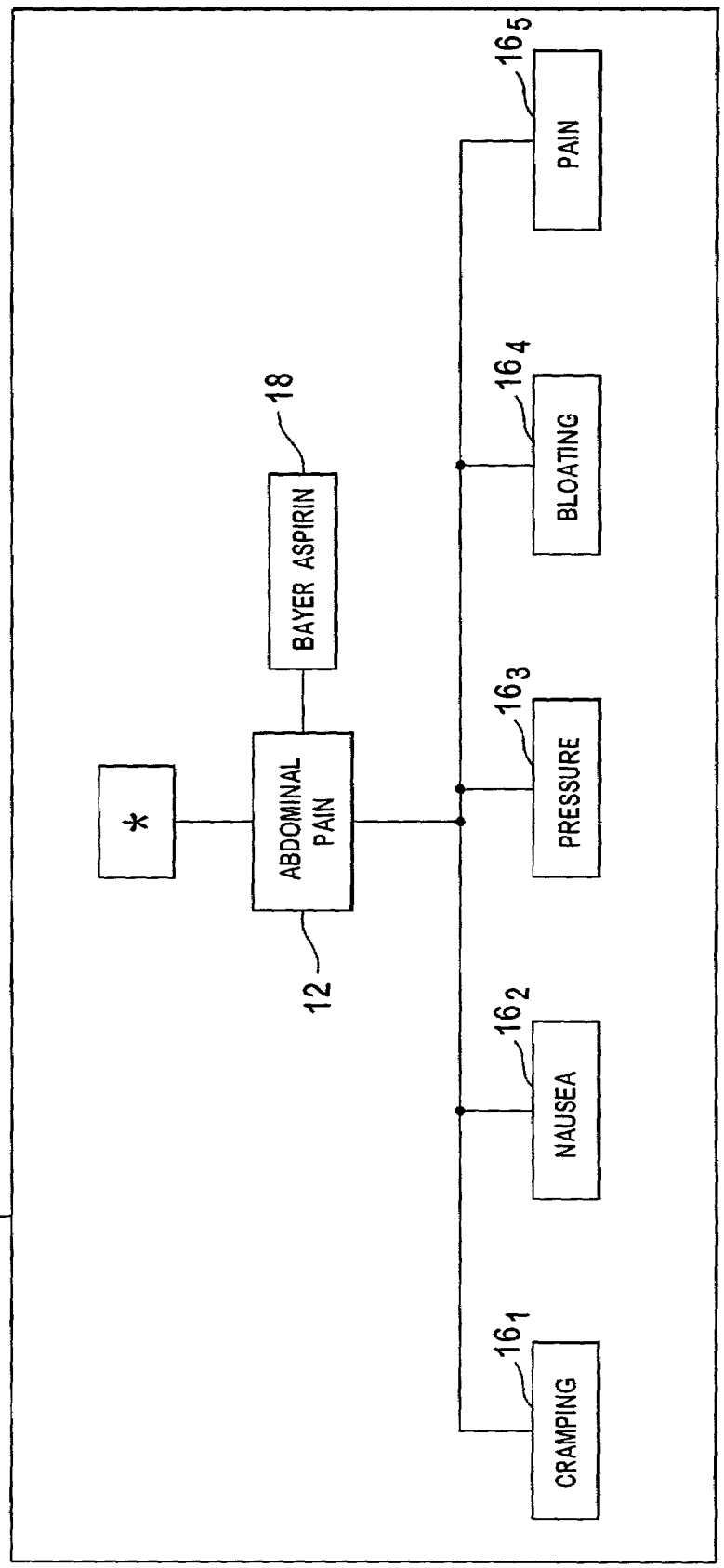
FIG. 2B is a first exemplar structure for an object BAYER ASPIRIN.

In this example, a collection manager decides to organize a collection of drugs for side effects. Therefore, it is assumed that exemplar structures 10 will be constructed relative to the property SIDE EFFECTS, and the objects are a group of drugs. Referring to FIG. 2B, an exemplar structure 30 for the first object 18, the drug BAYER ASPIRIN, is shown. The exemplar structure 30 includes an object 18 (BAYER ASPIRIN), an exemplar 12 (ABDOMINAL PAIN) and a plurality of attributes $16_1$–$16_5$ (CRAMPING, NAUSEA, PRESSURE, BLOATING and PAIN) for the property 20 (SIDE EFFECTS). The exemplar structure 30 also includes at least one broader term 14, which will be explained in greater detail hereinafter.

Conceptually, ABDOMINAL PAIN is a good example of a side effect of the drug BAYER ASPIRIN, and the attributes $16_1$–$16_5$ CRAMPING, NAUSEA, PRESSURE, BLOATING and PAIN provide a more detailed description of the particular instances of ABDOMINAL PAIN that result from ingesting the drug BAYER ASPIRIN. The exemplar structure 10 provides a simple, but robust configuration for capturing maximally distinct and thus maximally informative meaning instances of a property 20.

Figure 2C:
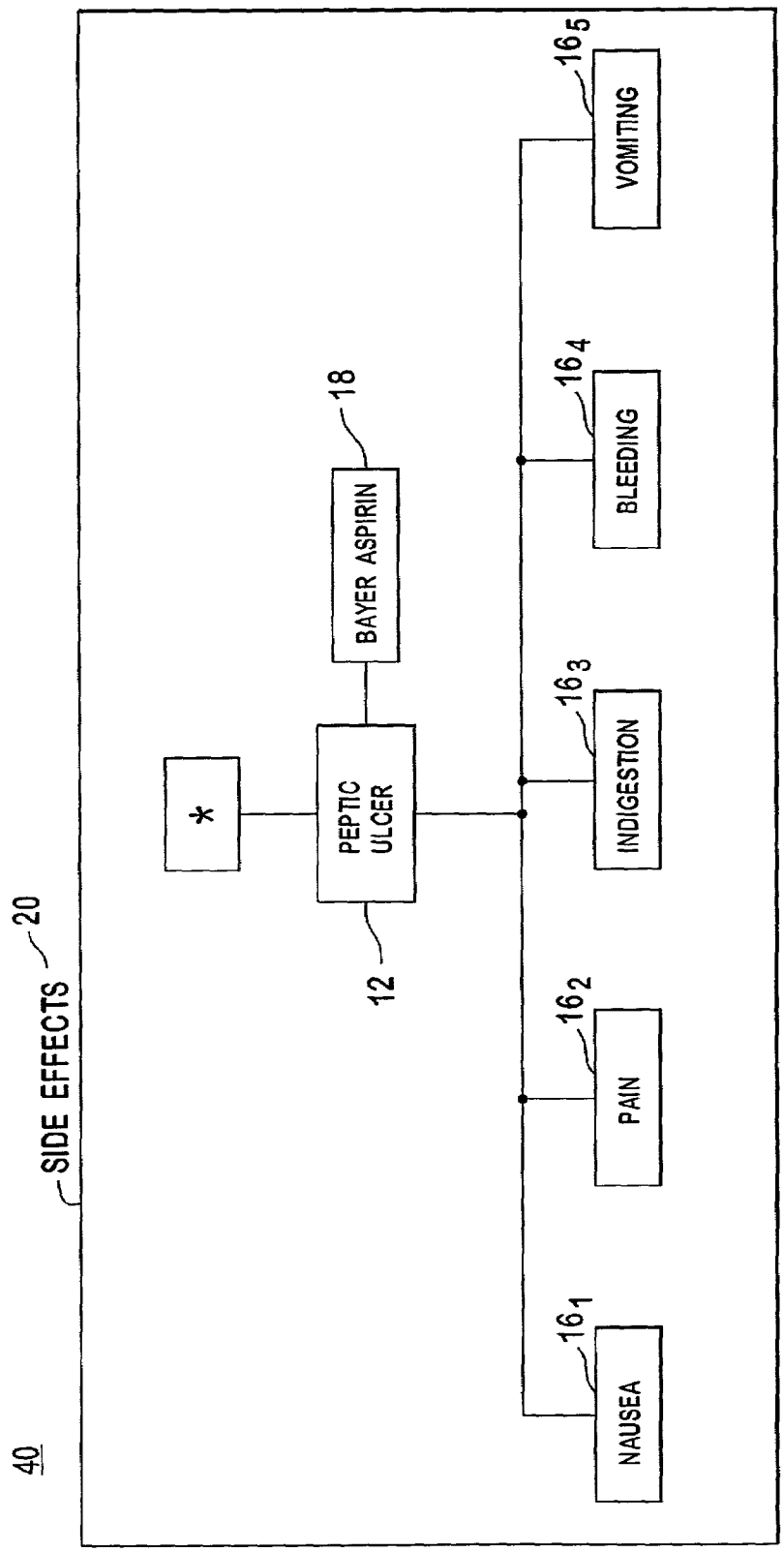
FIG. 2C is a second exemplar structure for an object BAYER ASPIRIN.

Referring to FIG. 2C, a second exemplar structure 40 for the first object 18, the drug BAYER ASPIRIN, is shown. Since the second exemplar structure 40 pertains to the same object 18, BAYER ASPIRIN as FIG. 2B, the object 18 is shown again in FIG. 2C as BAYER ASPIRIN for the same property 20 SIDE EFFECTS. However, the exemplar 12 is PEPTIC ULCER and the plurality of attributes $16_1$–$16_5$ are NAUSEA, PAIN, INDIGESTION, BLEEDING and VOMITING. Accordingly, PEPTIC ULCER is another good example of a side effect of the drug BAYER ASPIRIN, and the attributes NAUSEA, PAIN, INDIGESTION, BLEEDING and VOMITING provide a more detailed description of a PEPTIC ULCER that results from ingesting the drug BAYER ASPIRIN.

Figure 2D:
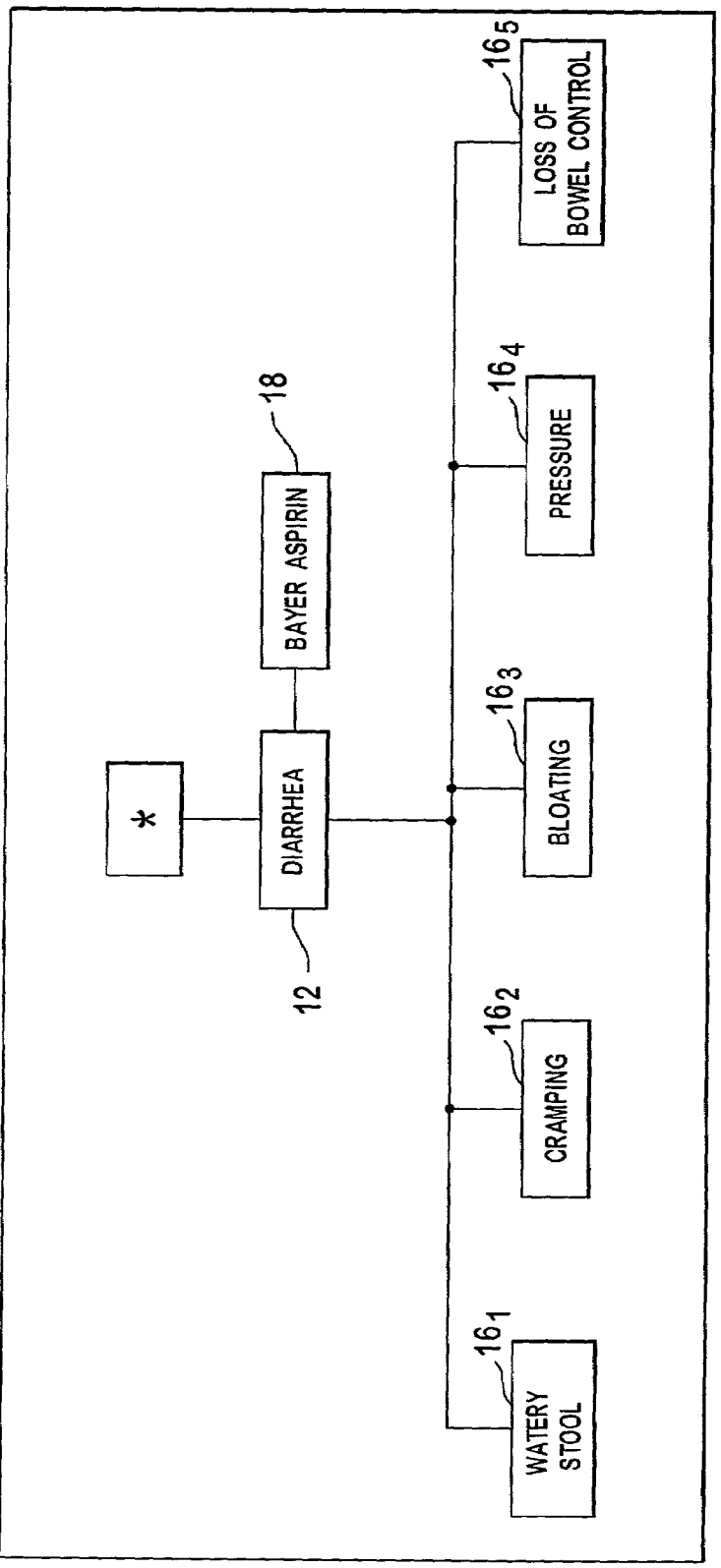
FIG. 2D is a third exemplar structure for an object BAYER ASPIRIN.

Referring to FIG. 2D, a third exemplar structure 50 for the first object 18, the drug BAYER ASPIRIN, is shown. Since the third exemplar structure 50 pertains to the same object 18, BAYER ASPIRIN as FIG. 2B, the object 18 is shown again in FIG. 2D as BAYER ASPIRIN for the same property 20 SIDE EFFECTS. However, the exemplar 12 is DIARRHEA and the pluralities of attributes $16_1$–$16_5$ are WATERY STOOL, CRAMPING, BLOATING, PRESSURE and LOSS OF BOWEL CONTROL. Accordingly, DIARRHEA is another good example of a side effect of the drug BAYER ASPIRIN, and the attributes WATERY STOOL, CRAMPING, BLOATING, PRESSURE and LOSS OF BOWEL CONTROL provide a more detailed description of DIARRHEA that results from ingesting the drug BAYER ASPIRIN.

As each exemplar structure 10 is created, broader terms $14_1$–$14_N$ must be assigned to each exemplar 12 to set the exemplar 12 in a particular context. In accordance with the present invention, in order to facilitate the assignment of broader terms $14_1$–$14_N$, a predefined database of broader terms $14_1$–$14_N$ may be provided. Preferably, the Library of Congress subject heading database (hereinafter, the "LOC database") serves as the predefined database of broader terms. The subject heading classifications of the LOC database embody over 100 years of historical, cultural, and scientific knowledge that has been systematically categorized. While constructing exemplar structures 10, the user explores the LOC database taxonomy for the purpose of selecting a broader term path, (i.e. appending contextual terms to the exemplar 12). Using the LOC database as an editorial tool minimizes the possible arbitrariness of broader term assignment. Because the creation of broader terms $14_1$–$14_N$ is an abstract construction, using the LOC will systematically guide the administrator from a reliable taxonomy. Once an exemplar 12 is entered, the user accesses the predefined LOC database to "anchor" the exemplar with the desired broader term path.

It should be recognized that although the specific use of the information from LOC database is optional, a database of broader terms having a reliable taxonomy for appending broader terms $14_1$–$14_N$ is not optional. Regardless of the source of the information, a broader term path must be constructed from a reliable taxonomy. For convenience, however, this reliable taxonomy will be referred to hereinafter as the LOC database.

Figure 3A:
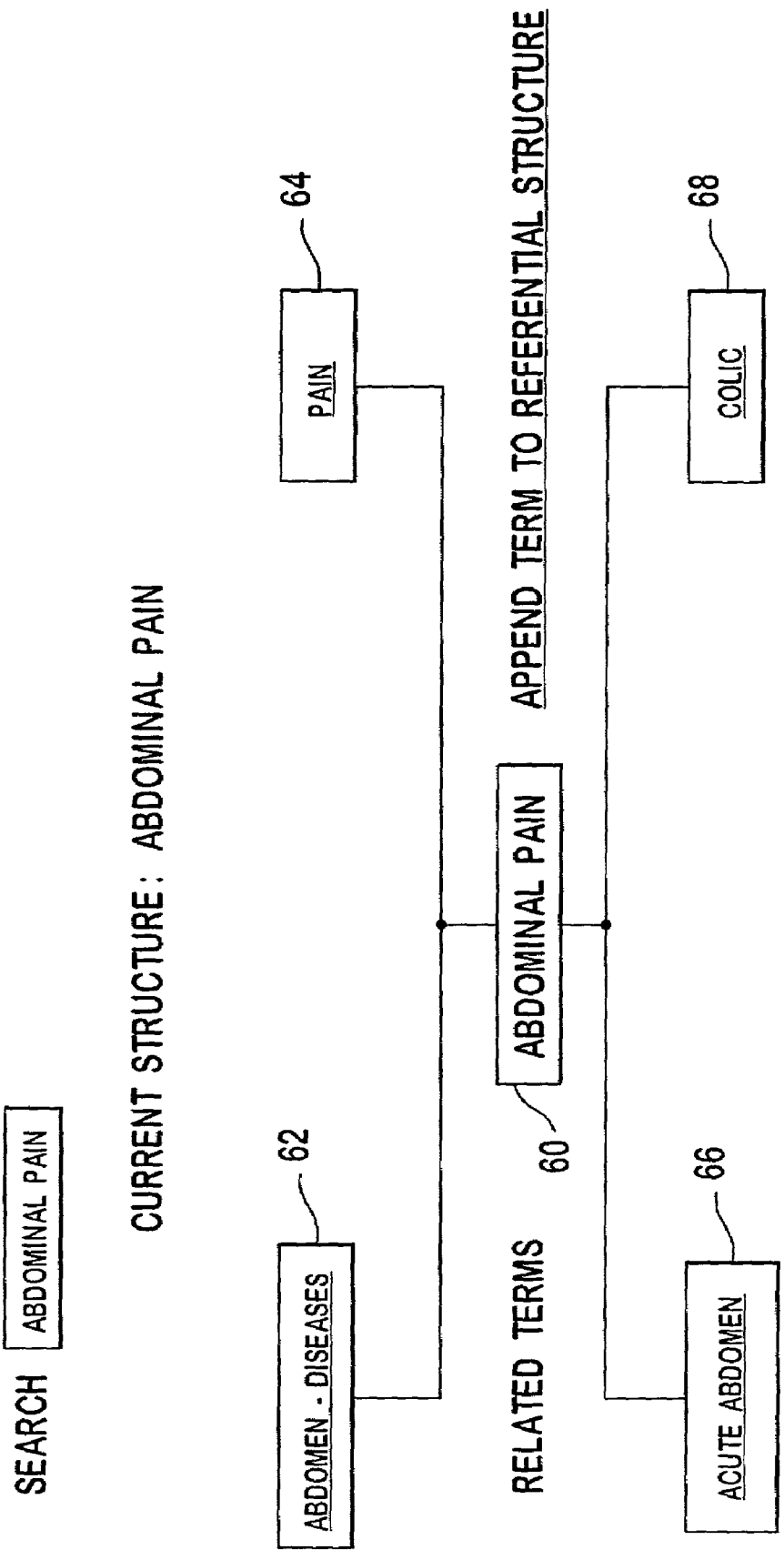
FIG. 3A is an excerpt utilizing the LOC database for the exemplar ABDOMINAL PAIN shown in FIG. 2B.
Figure 3B:
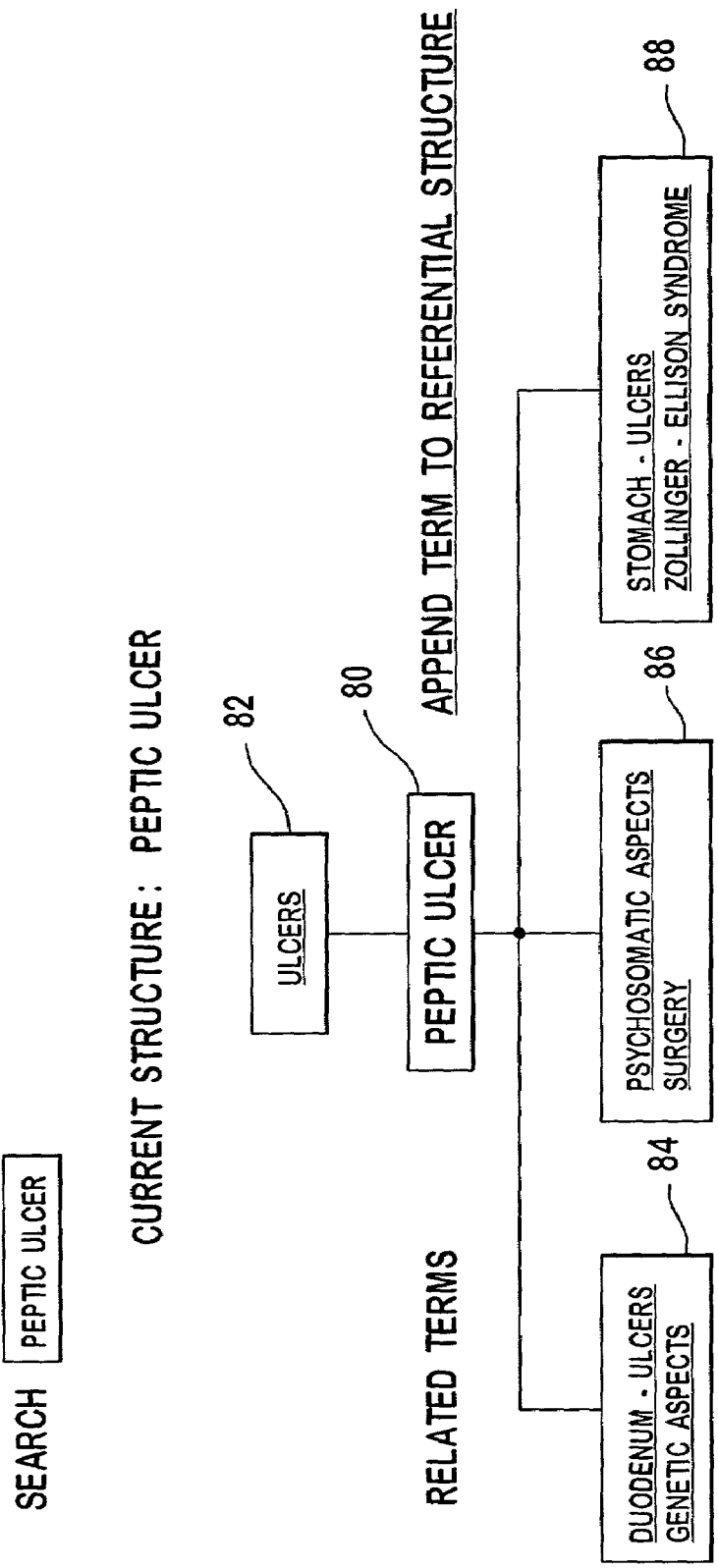
FIG. 3B is an excerpt utilizing the LOC database for the exemplar PEPTIC ULCER shown in FIG. 2C.
Figure 3C:
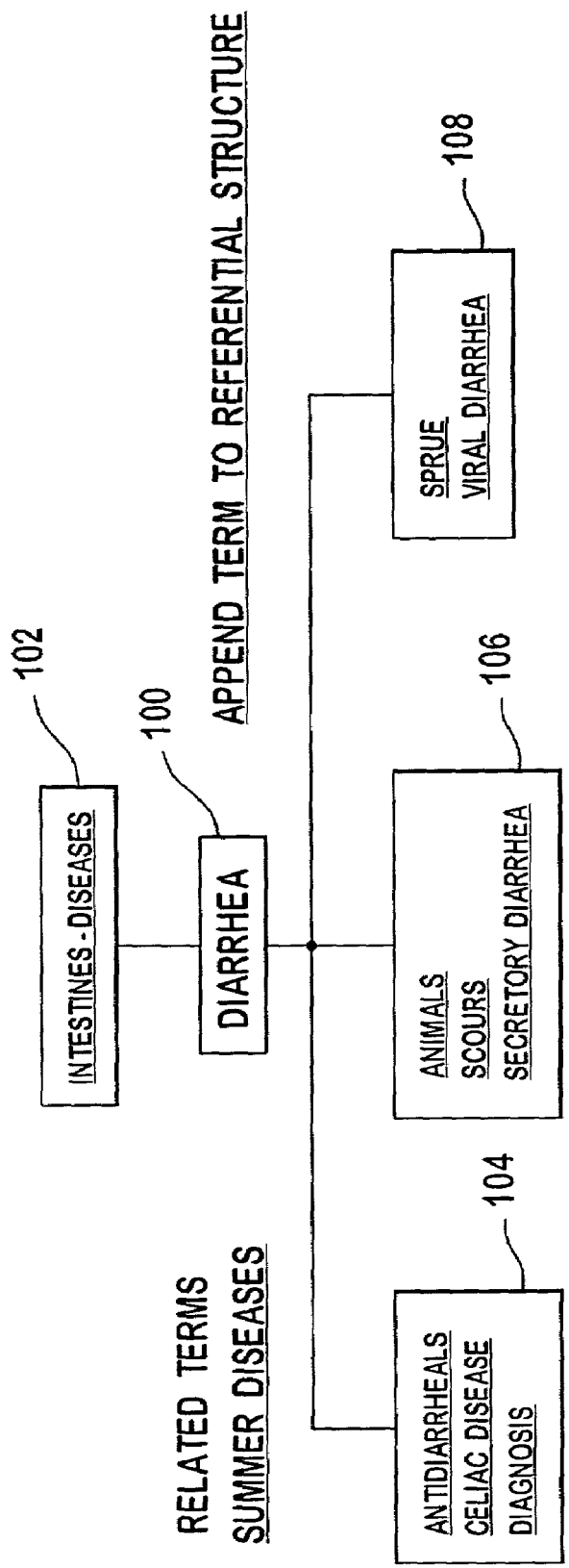
FIG. 3C is an excerpt utilizing the LOC database for the exemplar DIARRHEA shown in FIG. 2D.

Examples of excerpts from the LOC database as it is utilized for appending exemplar structure terms, are shown in FIGS. 3A–3C: ABDOMINAL PAIN 60 as shown in FIG. 3A; PEPTIC ULCER 80 as shown in FIG. 3B; and DIARRHEA 100 as shown in FIG. 3C. For example, referring to FIG. 3A, the collection administrator inputs the exemplar ABDOMINAL PAIN 60 in the search field. The system returns the information from the LOC database related to ABDOMINAL PAIN 60. The collection administrator then selects (and "appends") from the broader terms presented (i.e., ABDOMINAL DISEASES 62 or PAIN 64). The system will continue to return information from the LOC database of successively broader terms until a unique beginner has been reached. Unique beginners are generic concepts that serve as the broadest terms and therefore represents the most abstract category to which an exemplar 12 is associated. In essence, unique beginners are the broadest possible terms in the LOC database. If the collection administrator does not like the choices presented by the system, they may enter another term that may be more descriptive.

In order to further enhance the search and retrieval characteristics, the collection management system utilizes a synonym database, which comprises a plurality of synonym sets 120, (hereinafter "synsets"). As the user associates each attribute $16_1$–$16_N$ to an exemplar 12, one or more synsets 120 for each attribute $16_1$–$16_N$, ranked by usage, is displayed. A synset 120 is a cluster of like-meaning words representing one sense of a word. The user chooses a single synset 120, and therefore one sense of a word, thereby reducing the arbitrariness of attribute assignment.

Once an attribute $16_1$–$16_N$ is anchored to a synset 120, the system automatically assigns additional hyponyms to noun and verb forms, and synonyms to adjective forms. For example, if the attribute 12 is CAT, then the most direct hyponyms are 'domestic cat', 'house cat', '*Felis Domesticus*' and '*Felis Catus*'. At the next level of specificity, 'kitty', 'mouser' 'alley cat', to name a few, are also considered hyponyms. All of these hyponyms and synonyms are attached to the attribute 12 CAT.

Utilizing synsets $120_1$–$120_N$, (and associated synonyms and hyponyms) the collection management system compares "concepts", instead of performing a simple word match as is performed with current data management systems. An example of this aspect of the invention will be explained with reference to FIGS. 4A and 4B.

Figures 4A, 4B:
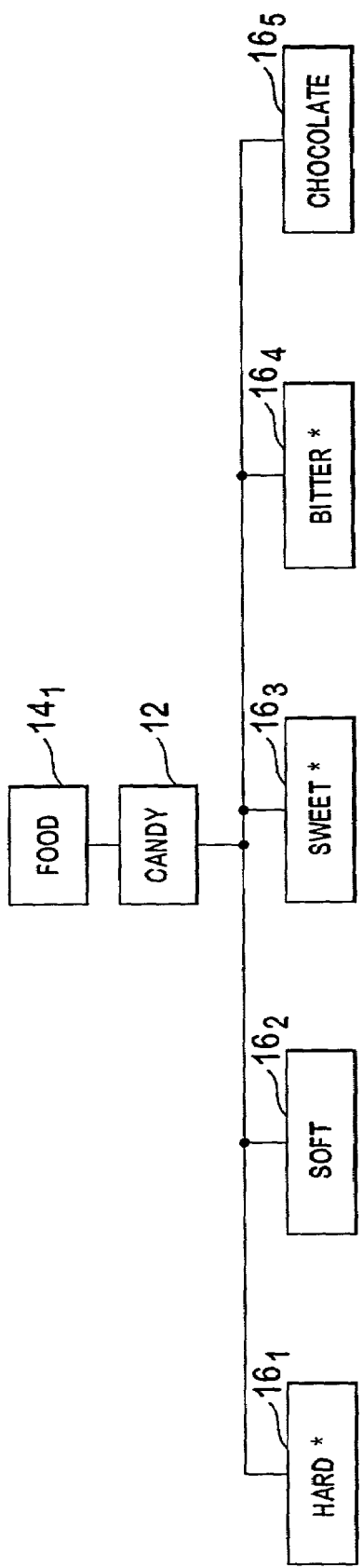
FIG. 4A is an exemplar structure for the exemplar CANDY within the context of FOOD.
FIG. 4B is a table of certain attributes of FIG. 4A, their synsets and,their associated ranks.

As shown in FIG. 4A, the exemplar 12 is CANDY within the context of FOOD having the attributes $16_1$–$16_5$ of HARD, SOFT, BITTER, SWEET and CHOCOLATE. (In this example, only three of the five attributes $16_1$, $16_3$, $16_4$ have one or more synsets $120_1$–$120_N$; these attributes are identified with an asterisk*). Referring to FIG. 4B, the attribute $16_1$ HARD has three different synsets: 1) the first synset $120_1$ comprising FIRM, UNMALLEABLE, SOLID and DENSE; 2) the second synset $120_2$ comprising DIFFICULT and TOUGH; and 3) the third synset $120_3$ comprising HEARTLESS, PITILESS, IMPENITENT and CALLOUS. The attribute BITTER is related to four synsets $120_4$–$120_7$, and the attribute SWEET is related to two synsets $120_8$–$120_9$. When the collection administrator associates an attribute $16_1$–$16_N$ that has one or more related synsets $120_1$–$120_N$ with an exemplar 12, the system will prompt the user to select from one of the synsets $120_1$–$120_N$. The system may also automatically associate additional related hyponyms and synonyms to the synset $120_1$–$120_N$, (not shown). In all subsequent processing, the system not only associates the attribute $16_1$–$16_N$ with a particular exemplar 12, but also associates the entire synset $120_1$–$120_N$, and its associated hyponyms and synonyms to the exemplar 12.

In order to assist the collection administrator to select the proper synset $120_1$–$120_N$, each synset $120_1$–$120_N$ is provided with a rank, from most common to least common usage. The user can choose the most common usage, a specialized use, or an archaic use.

For the example shown in FIGS. 4A and 4B, when the collection administrator inputs the attribute $16_1$ HARD into the system, three synsets $120_1$–$120_3$ will appear: 1) The first synset $120_1$ comprising FIRM, UNMALLEABLE, SOLID and DENSE; 2) the second synset $120_2$ comprising DIFFICULT and TOUGH; and 3) the third synset $120_3$ comprising HEARTLESS, PITILESS, IMPENITENT and CALLOUS. In the context of the broader term $14_1$ FOOD, the most appropriate selection would be the first synset $120_1$. Once this synset $120_1$ is selected by the collection administrator, the system automatically equates all of the synonyms and hyponyms in the first synset $120_1$ with the attribute $16_1$ HARD. In this manner, the invention organizes a legion of words to describe a particular exemplar 12, thereby distinguishing the individual instances of meaning for each exemplar 12, and increasing the hit rate of search terms.

Figure 5:
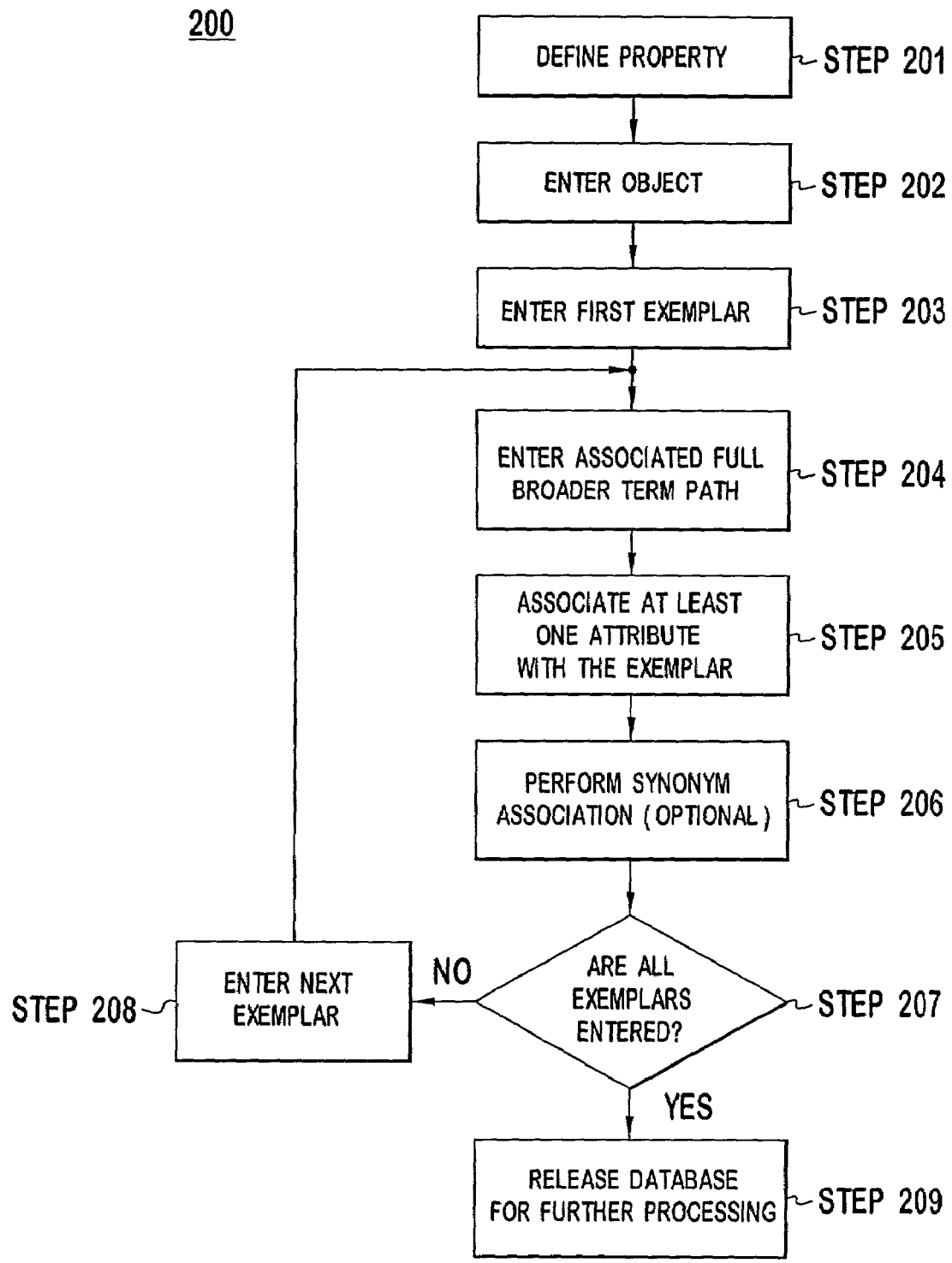
FIG. 5 is a procedure for creating exemplar structures.

A procedure 200 for creating exemplar structures is shown in FIG. 5. In Step 201, the collection administrator enters the desired property. The collection administrator subsequently enters a first object (Step 202) and a first exemplar associated with the object (Step 203). The collection administrator then enters the associated broader term path which places the exemplar in the desired context (Step 204). The broader term path is appended from the database supplied to the user which may include, but is not limited to, the LOC database as shown in FIGS. 3A–3E. The broader term path ends with the attachment of a unique beginner to the exemplar. The collection administrator then associates at least one attribute with the exemplar (Step 205). A synset association may then be performed (Step 206), although this step is optional.

It is then determined whether or not all the exemplars have been entered (Step 207). If not, the next exemplar is entered (Step 208) and Steps 204–207 are then repeated. If all of the exemplars have been entered, the collection of exemplar structures is released for further processing as will be explained in further detail hereinafter (Step 209). It should be noted that the order of the steps may be altered without departing from the spirit and scope of the present invention. For example, Step 204 may be performed after Step 205, without negative effects. Additionally, Step 206 may be eliminated.

Once all of the exemplar structures 10 for an object 18 have been created and associated with their synsets, the structures 10 are then prototypically categorized to produce a relative arrangement of best choices. Prototypical categorization establishes core and marginal exemplars 12. Core exemplars 12 (i.e. "prototypes") share more frequently used attributes $16_1$–$16_N$ than marginal exemplars 12. Prototypical categorization also makes it possible to view a range of exemplars 12 for a property outside the prototypical core. The collection management system performs categorization by determining the number of common attributes $16_1$–$16_N$ and attribute combinations which exist between all exemplars 12 of a category. There are three different methods for prototypically categorizing exemplar structures: 1) semasiological salience categorization; 2) onomasiological salience categorization; and 3) productivity categorization.

Semasiological salience categorization (hereinafter S-categorization) is performed to determine which exemplars 12 are "core exemplars" or "prototypes", (and are therefore probably more relevant), and which exemplars 12 represent more "marginal" status, (and are possibly less relevant, but always maintaining a categorical "family resemblance"). The system performs S-categorization by determining the number of common attributes $16_1$–$16_N$ which exist between exemplars 12; whereby the more attributes $16_1$–$16_N$ that an exemplar 12 has in common with other exemplars 12 of a category, the higher the value that particular exemplar 12 will have. Exemplars 12 having the highest categorization will be considered prototypes, and exemplars 12 with a lower categorization will be relegated to a more marginal position.

S-categorization will be explained with reference to FIGS. 6A–6E. Collectively, the exemplar structures 280–286 in FIGS. 6A–6D are "good examples" of the property 20 HOUSEHOLD ITEMS. The object $80_1$–$80_4$ attached to each exemplar structure 280–286 is the particular brand associated with each household item.

Figure 6A:
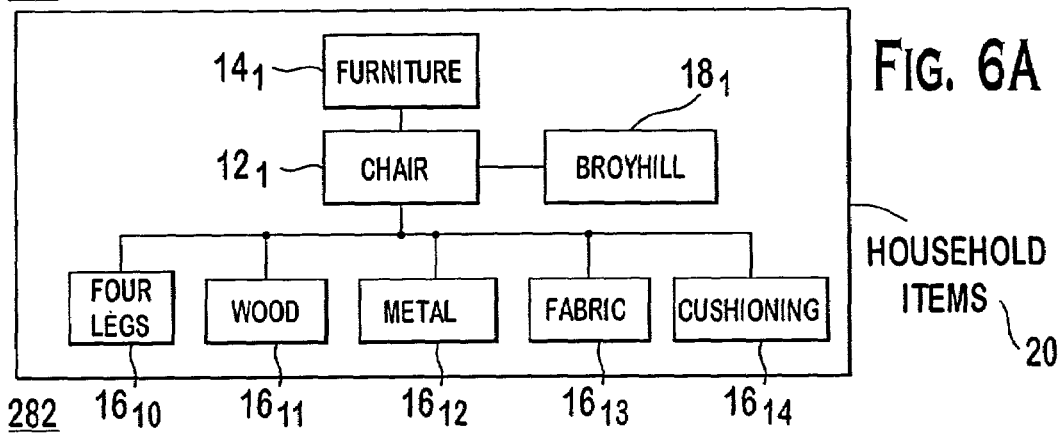
FIGS. 6A–6D are exemplar structures for the property HOUSEHOLD ITEMS.
Figure 6B:
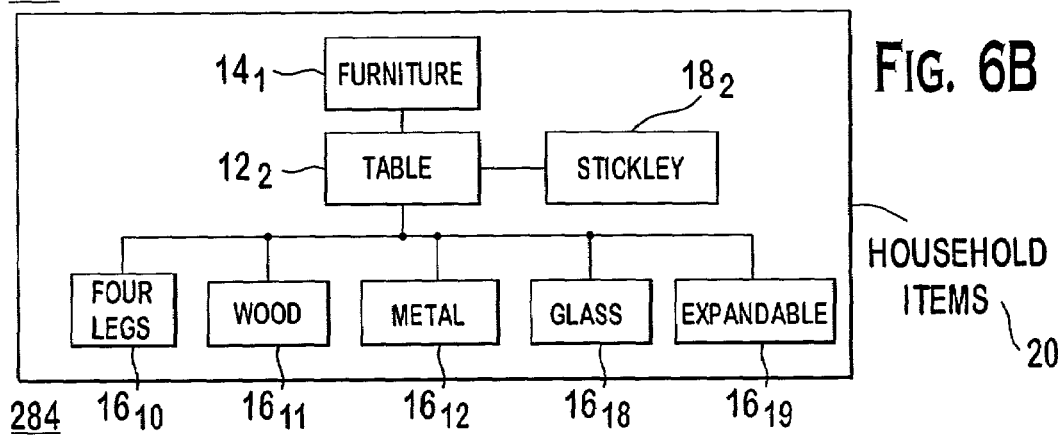
Figure 6C:
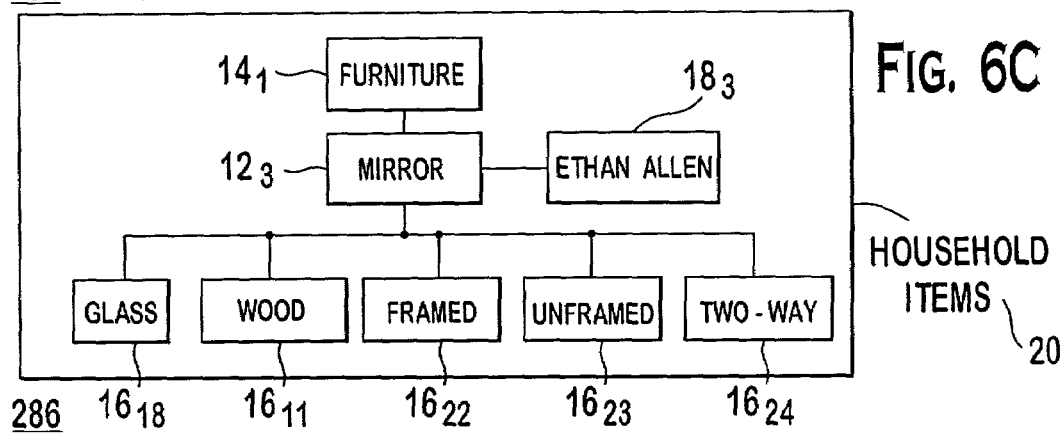
Figure 6D:
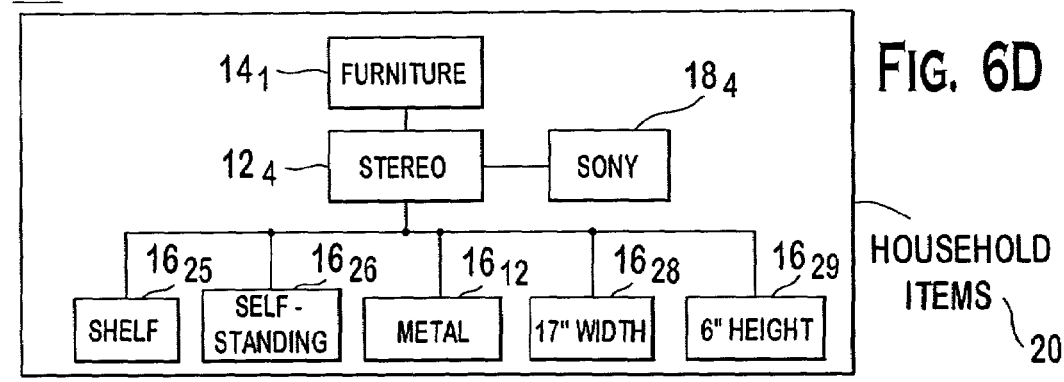

FIG. 6E illustrates the S-categorization for the exemplar structures 280–286 shown in FIGS. 6A–6D. As shown, the system first determines a "match value" from each attribute $16_{10}$–$16_{29}$ or combination of attributes, and increases the count of each associated exemplar $12_1$–$12_4$ by that match value. For example, the attribute FOUR-LEGS $16_{15}$ is common to CHAIR $12_1$ and TABLE $12_2$. Accordingly, the counts for CHAIR and TABLE exemplars $12_1$ and $12_2$ are incremented by one. Likewise, since the attributes WOOD, METAL, and GLASS $16_{11}$, $16_{12}$, $16_{18}$ are common to more than one exemplar 12, the counts for their associated exemplars $12_1$–$12_4$ are each incremented by a value of one. Once it has been determined whether or not each attribute $16_{10}$–$16_{29}$ has a match, the system then determines whether each combination of attributes $16_{10}$–$16_{29}$ has a match. For example, the combination of two attributes (FOUR-LEGS and WOOD $16_{10}$–$16_{11}$) is common to both CHAIR and TABLE exemplars $12_1$–$12_2$. Accordingly, the counts for these exemplars $12_1$–$12_2$ are each increased by a value of two. Likewise, the combination of GLASS and WOOD $16_{18}$–$16_{11}$ is common to two exemplars $12_2$–$12_3$, the combination of METAL and WOOD $16_{12}$–$16_{11}$ is common to two exemplars $12_1$–$12_2$, and the combination of FOUR LEGS and METAL $16_{10}$–$16_{12}$ is common to two exemplars $12_1$–$12_2$. Accordingly, the counts for these exemplars $12_1$–$12_2$ are each incremented by a value of two.

Once all of the double combinations of attributes $16_{10}$–$16_{29}$ are accounted for, the system then determines if there are triple (or greater) combinations. In the present example, there is one triple combination of attributes of FOUR-LEGS and WOOD and METAL $16_{10}$, $16_{11}$, $16_{12}$ which is common to CHAIR and TABLE exemplars $12_1$–$12_2$. Thus, the counts for these exemplars $12_1$–$12_2$ are increased by a value of three.

It should be noted that the particular values (i.e. 1, 2, 3) that were used for this example may be changed as desired by the user. This would permit the collection management system to be tailored to the particular needs of the user, and would allow different values to be assigned to different combinations. For example, since a triple combination may be extremely rare, it could increase the count of the associated exemplars by a greater value, such as 5.

Once all of the matchings for all attributes and combinations of attributes have been determined, the values are summed for each exemplar $12_1$–$12_4$ as shown in FIG. 4E. For example, the exemplar CHAIR $12_1$ includes the attributes of FOUR-LEGS $16_{10}$, WOOD $16_{11}$, METAL $16_{12}$, FOUR-LEGS/WOOD $16_{10}$–$16_{11}$, METAL/WOOD $16_{12}$–$16_{11}$, FOUR-LEGS/METAL $16_{10}$–$16_{12}$ and FOUR-LEGS/METAL/WOOD $16_{10}$, $16_{12}$, $16_{11}$. These attributes, or combination of attributes, provide the exemplar CHAIR 12 with a total value of 12. The same procedure is performed for each of the other exemplars $12_2$–$12_4$; in this example, TABLE $12_2$ has a value of 15, MIRROR $12_3$ has a value of 4 and STEREO $12_4$ has a value of 1.

Once each exemplar $12_1$–$12_4$ has been valued, they are then categorized according to their values. In the present example shown in FIG. 6E. CHAIR $12_1$ and TABLE $12_2$ are categorized as significant elements of HOUSEHOLD ITEMS 20, since they earn the highest total values; MIRROR $12_3$ is categorized less significantly, and STEREO $12_4$ is valued as least representative. CHAIR $12_1$ and TABLE $12_2$ in this example are considered to be core exemplars, (otherwise known as "prototypes"); STEREO $12_4$ would be considered to be a marginal exemplar; and MIRROR $12_3$ would be considered to be somewhere in between. Each exemplar value is also associated with the exemplar for future searching, as will be explained in detail hereinafter.

The collection management system, as an alternative, also displays those attributes which contribute to prototype categorization from the full range of attributes. Regarding the example of FIG. 6E, the user will understand that the prototypical instances of "FURNITURE", have four-legs, wood and metal. This can be shown automatically, or at the request of the user.

Prototypicality is recursive, in that the attributes that determine what is common among exemplars, and thereby determining category membership, these same attributes are more often then not prototype categories themselves. Just as exemplar structures are organized by prototype categories, so might attributes.

There are significant benefits to performing a search on a collection which has been S-categorized in accordance with the present invention. First, since each exemplar 12 has been categorized, those exemplars 12 having the highest categorization are displayed at the center of a context, while lesser categorized exemplars 12 extend out from the middle. Unlike searching a database where information is equally available with endless lists of results, S-categorization categorizes information so everything is accessible but not equally available; (i.e., not all information has equal status). The conceptual core of a concept becomes the focal designation. In a seemingly diverse set of exemplars the user is able to see similarity via the matching of attributes.

This type of information makes accessibility to a collection of objects highly efficient since a focal designation is automatically established for each category. The user can see how an exemplar 12 instantiates a prototype and which are marginal members of a category. Where interdependence of exemplar structures 10 is the distinguishing feature of the present invention's strategy of access, prototypes may be thought of as competitive "best choices". The user sees a set of choices in which each exemplar structure 10 is competing for the "most representative" or "best" position. Such information is largely neglected by current data management systems.

A collection administrator can use information regarding exemplar structures 10 to evaluate a collection by asking the following questions: Do exemplar structures 10 reflect planned characteristics of a collection? Which attributes $16_1$–$16_N$ of a category seem underrepresented? Which attributes $16_1$–$16_N$ of a prototype contribute most? Are these attributes reflected in other prototype categories? This information, and more, makes all attempts to adjust and fine-tune a collection extremely accurate and easy.

Moreover, a collection constructed in such a manner is flexible in that as objects 8 are added to the collection (and with them additional exemplar structures 10), the "status" of membership may change. For example, if it becomes fashionable for mirrors to be constructed of four-legs, metal and wood, and thus become self-standing, prototypicality will automatically change. In order to effect this change, S-categorization of the collection must be re-performed when new objects 18 are added.

As a second, more general example, if the collection being managed were news items, Richard Cheney would have been a prototypical member of a military category from 1989 to 1993. During this time he was Secretary of Defense and involved with Operation Just Cause and Operation Desert Storm. Being a subject in the news, (that is, being an instance of a news item), Cheney would have dropped back to a less dominant categorical position between 1994 and 2001, and moved back into a prototypical position with regard to the military, as Vice President, for his role in fighting terrorism. This ability to change with the times, and over time, is extremely valuable aspect of the present invention.

The second method of categorization is a method for determining onomasiological salience. This method of categorization identifies which exemplars 12 are "basic level terms". Basic level terms are special exemplars that are selected with greater frequency when considering all of the exemplars 12 with which a certain attribute $16_1$–$16_N$ is associated. In essence, onomasiological salience is a linguistic method that points to another kind of "best choice". onomasiological salience categorization (hereinafter "O-categorization") is a method whereby the user determines the exemplar 12, out of a plurality of exemplars 12 that are associated with an attribute $16_1$–$16_N$ in a context, which the user believes is most representative of that particular attribute $16_1$–$16_N$.

Figure 7:
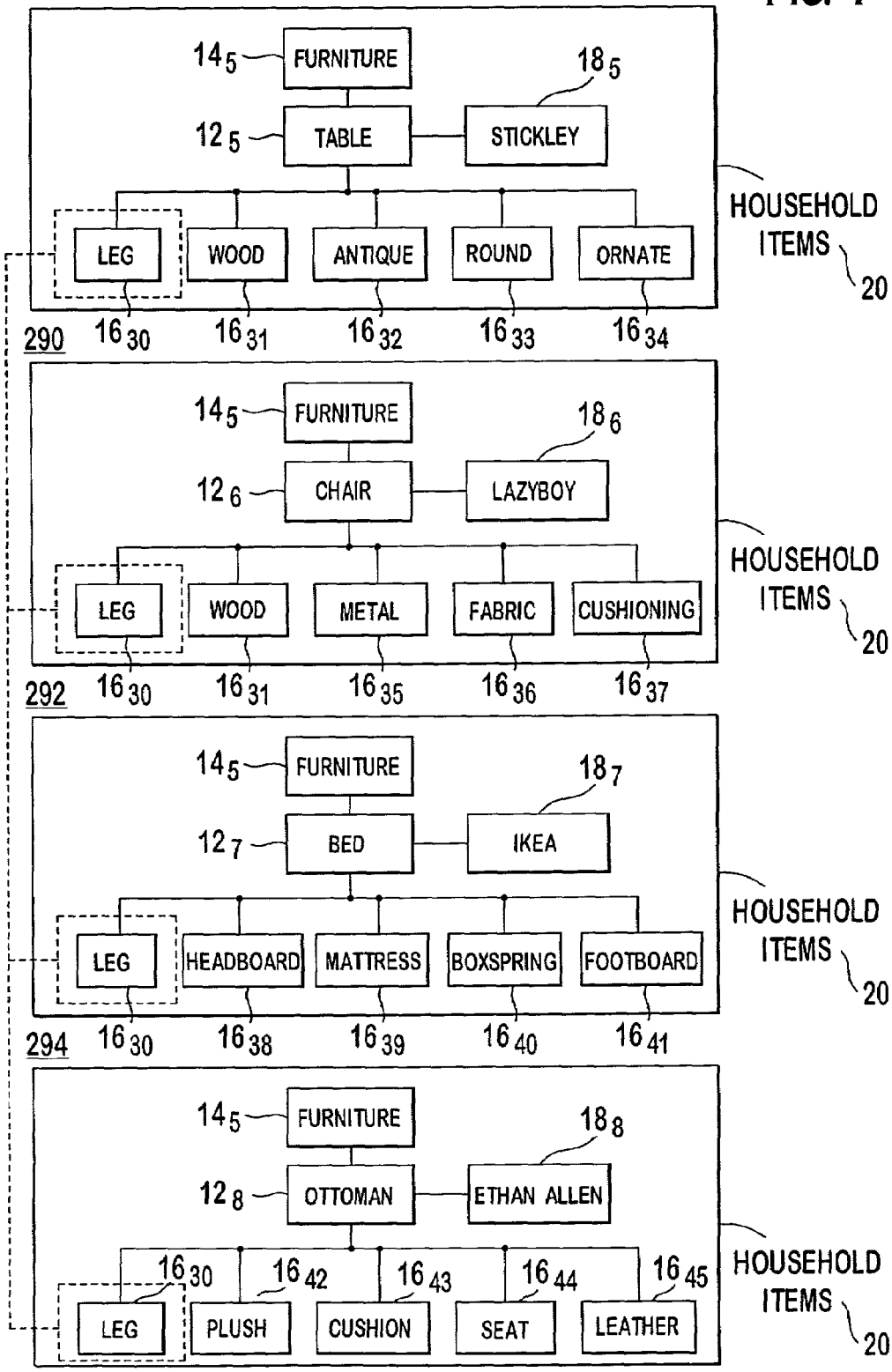
FIG. 7 is an example of O-categorization.

Referring to FIG. 7, in an example of O-categorization, assume that LEG $16_{30}$ is an attribute "held up" for inspection within the context of FURNITURE $14_5$. Associated exemplars are: BED $12_7$, TABLE $12_5$, CHAIR $12_6$ and OTTOMAN $12_8$. In O-categorization, the user selects the exemplar 12 which, in the user's mind, best represents LEG $16_{30}$. The exemplar 12 which is most often chosen is a basic level term. It should be noted that O-categorization is an iterative process that relies on selection from a plurality of individual users, wherein the basic level terms are those exemplars 12 which users choose statistically more often than other exemplars 12 related by a common attribute $16_1$–$16_N$. This is a specific choice presented to a general user when they are viewing an attribute while accessing the collection. Once enough users have performed O-categorization of the exemplars 12 to make the results statistically accurate, the collection will reflect onomasiological salience. Continuing the example of FIG. 7, for a collection which has been O-categorized with TABLE $12_5$ being most often chosen, the system displays the following message: "Most frequently chosen FURNITURE with regard to LEG is TABLE".

As will be described in further detail hereinafter with reference to searching, the choices made by users are tracked and the O-categorization of exemplars 12 is performed and updated in accordance with those choices. Accordingly, referring back to the example in FIG. 7, if it becomes very fashionable to attach highly ornamental legs to one's bed, O-categorization would most likely change over time and TABLE $12_5$ would be displaced by BED $12_7$ as a basic level term. In this manner, one can observe that cultural or scientific knowledge has a direct influence on O-categorization of exemplars. This influence makes searching a categorized collection very powerful and highly efficient.

Using this selection process, a categorization order is established for each set of exemplars 12 which are related by a common attribute $16_1$–$16_N$ for a given context. As exemplars 12 are identified as basic level terms, the conceptual side of a word (meaning), and therefore the relative arrangement of meaning structures for a collection, becomes cognitively and linguistically more salient. Although basic level terms, resulting from O-categorization, in many cases are the same core members of a category as prototypes resulting from S-categorization, this is not always the case. Semasiological and onomasiological saliences are not mirror images, in that prototypes may not necessarily be basic level terms. Each type of categorization provides a different perspective of a "best choice". Both of these best choices will be presented to a user. Therefore, exclusive concern with one method of prototypical categorization limits competition among exemplars for "best choice" positioning, and therefore leads to an impoverished view of meaning instances.

The third categorization process is a categorization for productivity, (hereinafter "P-categorization"). P-categorization is a method whereby the system retrieves all exemplars 12 and associated attributes $16_1$–$16_N$ associated with a broader term 14, and all objects 18 associated with these structures 10. The system counts the number of times an attribute $16_1$–$16_N$ is present. The results of P-categorization are expressed as a ratio of attribute $16_1$–$16_N$ usage over the number of objects 18 associated with the category. P-categorization shows how much contribution an attribute $16_1$–$16_N$ makes in defining a category. Establishing P-categorization for attributes $16_1$–$16_N$ assists the general user by: 1) determining how a relative arrangement of meaning instances become prototypical; and 2) counting the number of objects 18 attached to a particular meaning. P-categorization provides more information about competitive "best choices" so the general user can make his or her "best choice".

Referring to FIG. 8A, an example of the calculation of the productivity of attributes (i.e., P-categorization) is shown. This example assumes that the objects are a plurality of books (Book 1, Book 2 and Book 3) and the property is the subject of the book. Productivity of attributes is calculated over the number of objects associated with a given broader term. For the broader term RODENT, the exemplars are retrieved. These exemplars include PORCUPINE, MICE and RABBITS. For each exemplar term (representing N-dimensions of meaning), all instances of the exemplar are then retrieved (ex1, ex2, ex3, ex4, ex5, ex6 and ex7). For each exemplar (representing one meaning instance), the object (i.e. the book) associated with each exemplar is retrieved. Once the number of objects associated with the broader term is determined, that number of objects becomes the denominator when calculating productivity. In this example, there are five books and seven exemplars. Two books in this example have two exemplars that are associated with the broader term RODENT. The system then retrieves all of the attributes (a, b, c and d), and for each attribute, counts the number of times it is used to define an exemplar within the broader term RODENT. The productivity for an attribute is viewed as a ratio. Preferably, this is viewed by the user by placing the mouse directly over the attribute, although this may be displayed in a different format. The productivity count for the example of FIG. 8A is shown in FIG. 8B.

It is important to note that when counting attributes for particular exemplars (ex1, ex2 . . . ex7) within the broader term RODENT, the only exemplars that are retrieved are the exemplars which have the broader term RODENT in their exemplar structure. For example, if FASTENER was the broader term and NAILS, SCREWS and BOLTS were exemplars, the system ensures that when getting exemplars anchored to NAILS, it obtains exemplars that had FASTENER as a broader term and not SKIN in the exemplar structure. This is automatic. The rules that make the structures take care of this.

Conceptually, a relative arrangement of meaning instances is always three-dimensional. An instance may be thought of as one layer of meaning, whereby dimension is established by associating like-meaning instances together. Since each meaning instance is associated with an exemplar structure, the relative arrangement of identical exemplars (with associated contexts and attributes) make a 3-dimensional shape of meaning as shown in FIGS. 1B–1D. Accordingly, the collection management's conceptual model of meaning instances and configuration space eliminates redundancy. Common construction of different instances make one thing.

In summary, after a collection administrator constructs all exemplar structures 10 for an object 18, the structures 10 are released to configuration space for prototypical categorization processing. The configuration space is a complex adaptive collection, whereby any additions or changes to exemplar structures by a collection administrator will automatically adjust the relative arrangements of meaning instances after prototypical categorization is performed.

Prototypical categorization is applied to a relative arrangement of exemplar structures 10. Each category, (i.e., all exemplar structures related to a broader term), are organized (i.e. "shaped") by S-categorization to reduce the limitless variation of exemplar structures 10 into manageable portions. For example, all exemplar structures 10 associated with the broader term PAIN are categorized prototypically. In addition, P-categorization is performed by determining productivity values, which are assigned to each attribute $16_1$–$16_N$. O-categorization is begun by the collection administrator and continued by the general user during navigation.

An optional function for collapsing categories is utilized when collections are small. If a broader term $14_1$–$14_N$ is associated with fewer than three different exemplar structures, S-categorization has little to work with. Therefore, the collection administrator may set a minimum requirement for the number of exemplar structures 10 required to populate a category (all exemplar structures 10 related to a broader term $14_1$–$14_N$).

Since exemplar structures 10 include multiple broader-terms $14_1$–$14_N$ as shown in FIG. 2A, the collection administrator must select an appropriate context to categorize. The collection administrator determines the appropriate context by setting a level of category membership for the collection, relative to the objects 18 in it. The collection management system automatically adapts to this setting as the collection changes. Referred to as a collapsing function, the collection management system adjusts levels of category membership for uniformity.

For example, if the collapsing function is set limited to N, (members in a category where N=2), all categories must have at least three members. Therefore, categories of two, or less, collapse. The collection administrator determines this number from the size and characteristics of a collection. However, it should be understood that the number may be greater or lesser depending upon the decision made by the collection administrator.

Once all of the exemplar structures 10 have been created and prototypically categorized, the collection is released for use by a general user to search the collection and retrieve information as desired. As aforementioned, prototypical categorization provides a powerful tool for presenting to the general user, best choices which are "most likely" the results desired by the general user. The unique structure, categorization and relative arrangement of objects 18 in a collection, facilitates easier and more efficient searching and "looking" by the user and provides results which have perspective. This advantage over present data management systems is shown with reference to FIGS. 9A–9C, which illustrate some of the automatic strategies of searching that are available to the general user while accessing a collection.

Figure 9A:
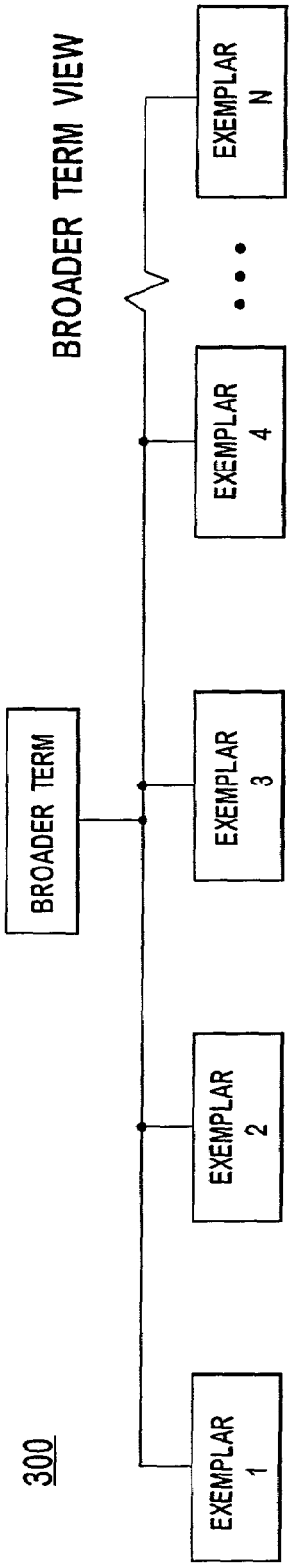
FIG. 9A is a broader term view.

Referring to FIG. 9A, the broader term view 300 includes a broader term and a plurality of associated exemplars. At this level, the attributes associated with the exemplars are not shown. Conceptually, a broader term view 300 shows an access term insofar as it is a single category, (a relative arrangement of exemplar structures from a broader term perspective). As will be explained in further detail hereinafter, a broader term view 300 is the view which is presented to the general user when the access term matches on a broader term, returning a relative arrangement of meaning instances. Associated exemplars of the broader term category are graphically designed to show prototypical status established by S-categorization. As well, results from O-categorization are graphically identified.

Figure 9B:
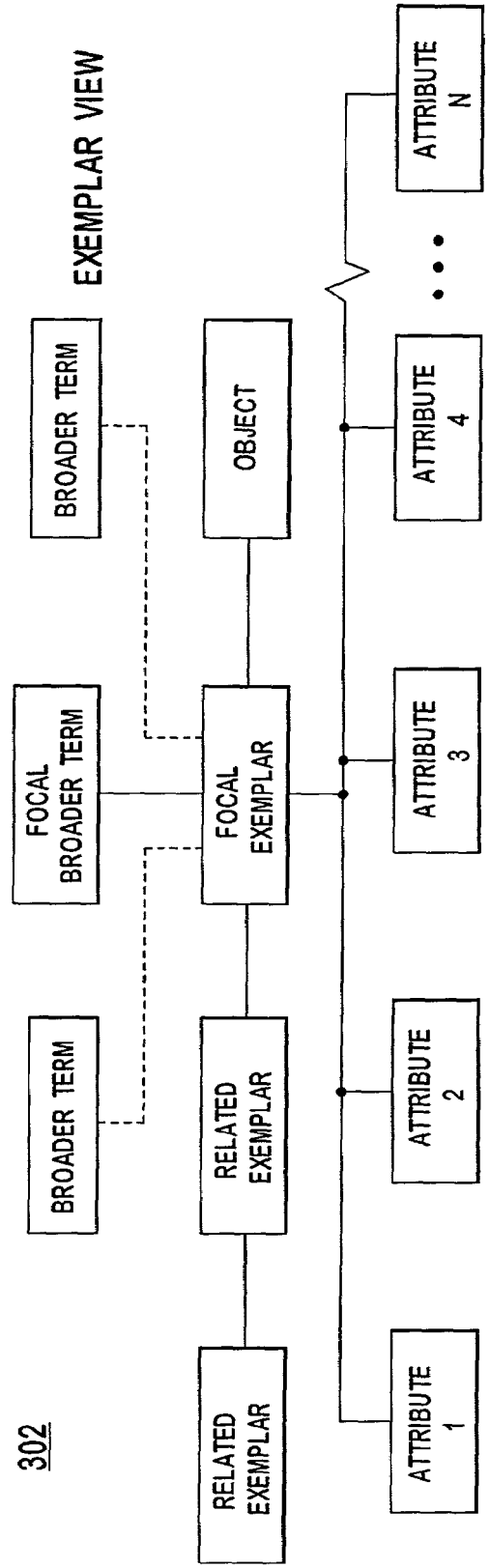
FIG. 9B is an exemplar view.

Referring to FIG. 9B, the exemplar view 302 displays the full exemplar structure including a focal broader term, focal exemplar, the associated object, and all of the attributes associated with the exemplar. Other broader terms associated with the exemplar are included, which indicates polysemy (multiple contexts). Related exemplars (other members of the focal broader term) are shown. Conceptually, an exemplar view 302 presents an access term insofar as it constitutes one or more categories. This view 302 depicts a relative arrangement of exemplar structures from an exemplar perspective. Values for S-categorization, O-categorization, and P-categorization are graphically designed to indicate best choices. The exemplar view 302 is presented to the general user when the access term matches on an exemplar, and a region in configuration space is returned.

Figure 9C:
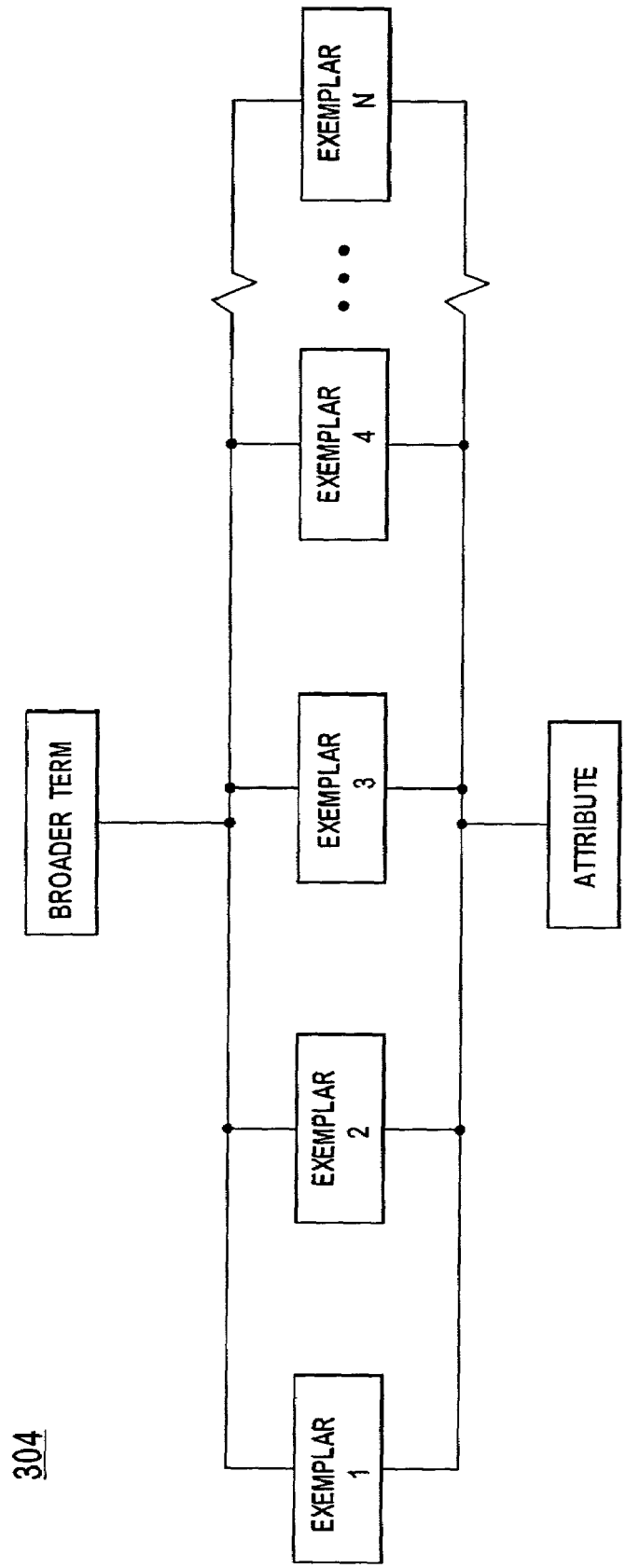
FIG. 9C is an attribute view.

Referring to FIG. 9C, the attribute view 304 includes a broader term, one attribute, and all of the exemplars associated with that attribute for the selected broader term. Conceptually, an attribute view 304 shows an access term as a distinguishing feature of many meaning instances, (a relative arrangement of exemplar structures related to an attribute and broader term). The attribute view 304 is presented to the user when the access term matches on an attribute, or when an attribute is selected for further exploration from the exemplar view 302.

It should be noted that when an access term is input by a general user, the system attempts to match the access term first to a broader term. If a broader term correctly matches the access term, the broader term view 300 shown in FIG. 9A is presented. If the access term does not match a broader term, the system determines whether the access term matches an exemplar. If so, the exemplar view shown 302 in FIG. 9B is presented to the general user. If not, the attribute view 304 as shown in FIG. 9C is presented to the user. If the access term input by the general user does not match a broader term, exemplar or attribute, the system will return a message to the general user indicating that no match has been found and that the general user should enter another access term.

Figure 10:
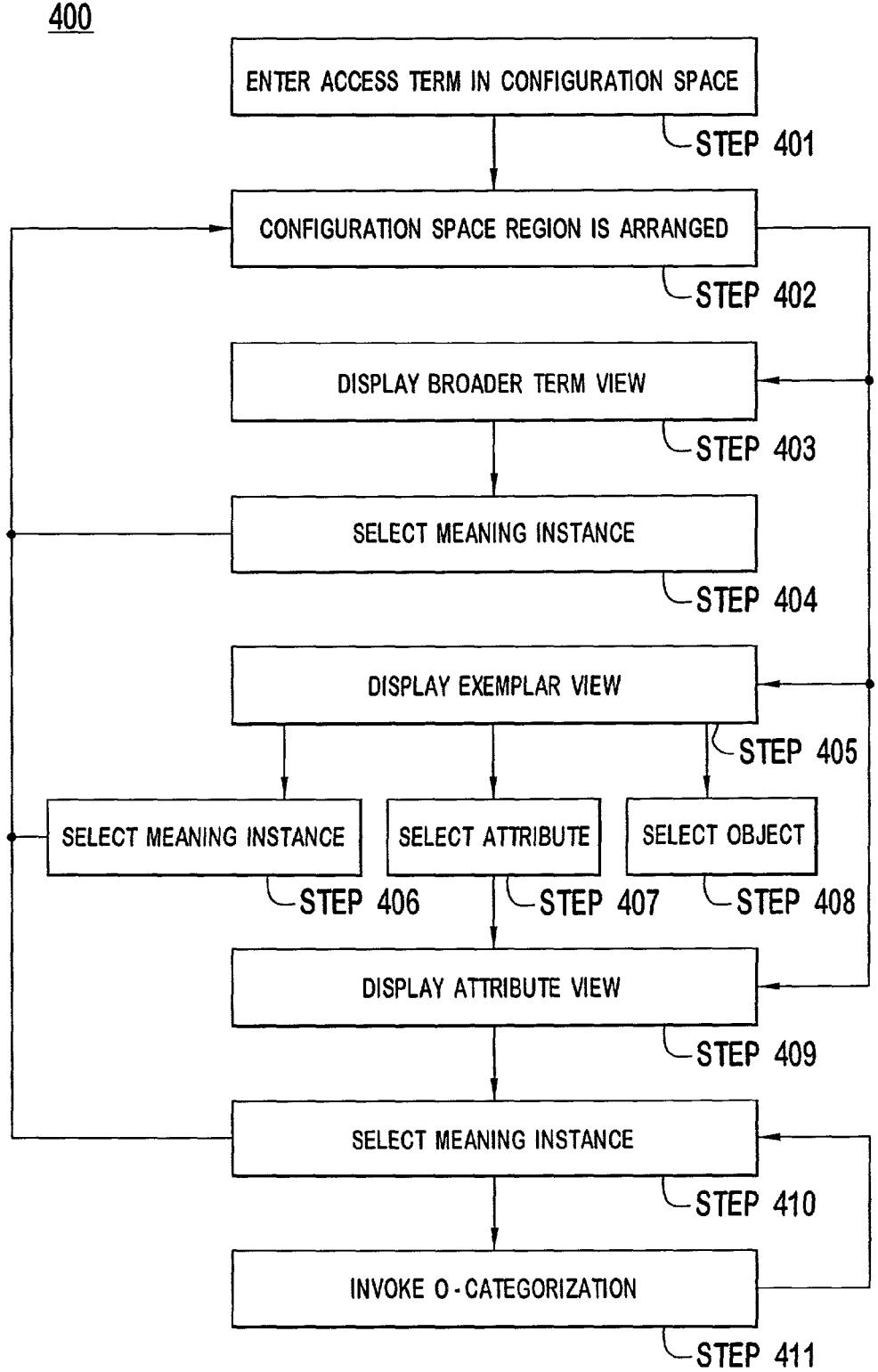
FIG. 10 is a flow diagram for navigation.

Referring to FIG. 10, a method 400 for navigating "meaning instances" a collection in accordance with the present invention is shown. This method 400 offers an automatic strategy for "looking" at meaning instances and assumes that the configuration space has been created. It also assumes that the configuration space has been prototypically categorized for semasiological salience (S-categorization), ononasiological salience (O-categorization) and productivity (P-categorization). A desired access term (a point) is entered by the general user and the collection management system determines the "regions" whose points correspond to a collection of meaning instances associated with the access term within the property space (Step 401). It does this by matching the access term to broader terms, exemplars, or attributes within the collection. The system first attempts to match the access term with a broader term, and then if unsuccessful, to an exemplar, and finally with an attribute. Depending upon the region of configuration space which matches the access term, the views shown in FIGS. 9A–9C will be presented to the user. Accordingly, once the configuration space is arranged (Step 402) and the access term matched on a the broader term, a broader term view will be presented to the user (Step 403). The user may then navigate the meaning instances of the view, i.e., one of the exemplars (Step 404). The configuration space will then be rearranged (back to Step 402) and the user may continue to navigate accordingly.

If the access term does not match a broader term, but matches an exemplar, the exemplar view is displayed (Step 405). From there, the user may navigate meaning instances (Step 406), select an attribute (Step 407), or select an object (Step 408). Selection of an attribute (Step 407) displays the attribute view to the general user (Step 409). From there, the user may navigate meaning instances (Step 410) and may optionally invoke O-categorization (Step 411). It should be noted that the user may "toggle" between views as desired, by selecting a desired attribute, exemplar or broader term.

Briefly, O-categorization is performed when the system displays the selected meaning instance, and all of the exemplars associated with that meaning instance. The user then selects the exemplar which the user believes is most representative of that attribute. The system stores this selection and uses this selection in performing O-categorization as was herein described with reference to FIG. 7.

There are several benefits to the collection management system of the present invention that provide significant advantages over prior art data management systems. First, although an access term of the present invention is entered as a point of reference and appears similar to prior art search terms, the response to the input of an access term is significantly different from prior art search terms. Unlike the prior art where word match is the response to a search term, an access term returns a configuration of three-dimensional meaning instances. Accordingly, the access term is entered as a word or phrase, but a relative arrangement of three-dimensional meaning instances provides a result with perspective.

Second, since the rules that govern the creation of exemplar structures make everything, the rules of prototype theory make it possible to see the collections best choices so the user can make his/her best choice, accurately and efficiently.

Third, the present invention automatically provides strategies for searching and looking, unlike prior art search mechanisms that only enable browsing, where the user must figure out where to look. Two automatic strategies of searching guide the user from: 1) A view when an access term represents a category, that is, when the user sees the access term as a context, (itself). This is something like an aerial view of a configuration space in that you can't yet see the attributes but you can see various plots in the "region" of meaning instances; and 2) When a term constitutes a category (or categories), whereby the user sees meaning instances in different contexts, and how important the instances are relative to the entire category or for a specific entity. Additionally, the attributes that determine best-choice, or probable status, are available to preview.

Finally, two perspectives are presented from the collection management system's automatic strategies for looking at meaning instances: 1) the user sees similarity in diversity, e.g. TABLE and STEREO are different yet similar, as they share common attributes; and 2) the user sees the full referential range of a category. Therefore, not only are prototypical subjects (CHAIR and TABLE) readily accessible, but the full range of a topic is accessible by having the marginal exemplars (MIRROR and STEREO) available. The "zebras" of a topic are relegated to marginal category status, but without them the range of meaning would be impoverished.

It should be noted that the present invention may be implemented using a PC, or any type of electronic system (not shown) which includes a processor with associated memory. Additionally, the collection manager, the general user and the collection management system need not be co-located. Access to the system by the collection manager or the general user may be facilitated by the use of the internet, a LAN, or a WAN or any other type of remote communication means.

While the present invention has been described in terms of the preferred embodiment, other variations which are within the scope of the invention as outlined in the claims below will be apparent to those skilled in the art.

What is claimed is:

1. A computer-implemented method of managing a collection of objects, the method comprising:
    selecting a property which is common to all of the objects, wherein the property is formed by a plurality of meaning instances, each meaning instance representing one dimension of meaning;
    creating at least one exemplar structure for each of the meaning instances, each exemplar structure comprising:
        (i) an object selected from the collection of objects;
        (ii) an exemplar;
        (iii) at least one broader term associated with the exemplar, which provides context to the exemplar;
        (iv) at least one attribute associated with the exemplar, which is a distinguishing feature of the exemplar; and
        (v) sense and synonym sets, which are automatically attached to the at least one attribute when the exemplar structure for the respective meaning instance has been defined;
    prototypically categorizing the exemplar structures; and
    using the exemplar structures to access information regarding the collection of objects.

2. The method of claim 1, wherein the prototypically categorizing further comprises:
    comparing the attributes from at least two of the exemplar structures;
    determining matching attributes;
    for each matching attribute, increasing a count for each exemplar structure related to the matching attribute; and
    ranking the exemplar structures by the value of the count.

3. The method of claim 2, wherein the exemplar structures having the highest count are considered to be the most prototypical.

4. The method of claim 1, further comprising onomasiological salience ranking the exemplar structures.

5. The method of claim 4, wherein the onomasiological salience ranking comprises:
    identifying a first attribute that is associated with a broader term and at least two exemplars; and
    selecting an exemplar, from the at least two exemplars, as best representing the attribute.

6. The method of claim 1, further comprising productivity ranking the attributes.

7. The method of claim 6, wherein the productivity ranking further comprises:
    counting the number of objects in the collection;
    determining, as a productivity value, the number of occurrences of the attribute; and
    dividing the productivity value of each attribute by the number of objects to generate a productivity ranking.

8. A data management system for managing a collection of objects having a common property formed by a plurality of meaning instances, each meaning instance representing one dimension of meaning, the system comprising:
    a computer interface configured for creating at least one exemplar structure for each meaning instance by:
        selecting an object from the collection of objects;
        assigning an exemplar;
        attaching at least one broader term with the exemplar, which provides context to the exemplar;
        attaching at least one attribute with the exemplar, which is a distinguishing feature of the exemplar; and
        automatically attaching sense and synonym sets to the at least one attribute when the exemplar structure for the respective meaning instance has been defined; and
    a processor configured for prototypically categorizing the exemplar structures wherein the exemplar structures are used to access information regarding the collection of objects.

9. The data management system of claim 8, wherein the processor prototypically categorizes the exemplar structures by:
    comparing the attributes from at least two of the exemplar structures;
    determining matching attributes;
    for each matching attribute, increasing a count for each exemplar structure related to the matching attribute; and
    ranking the exemplar structures by the value of the count.

10. The data management system of claim 9, wherein the exemplar structures having the highest count are considered to be the most prototypical.

11. The data management system of claim 8, wherein the computer processor is configured for onomasiological salience ranking the exemplar structures.

12. The data management system of claim 11, wherein the onomasiological salience ranking comprises:
    identifying a first attribute that is associated with a broader term and at least two exemplars; and
    selecting an exemplar, from the at least two exemplars, as best representing the attribute.

13. The data management system of claim 8, wherein the computer processor is configured for productivity ranking the attributes.

14. The data management system of claim 13, wherein the productivity ranking further comprises:
    counting the number of objects in the collection;
    determining, as a productivity value, the number of occurrences of the attribute; and
    dividing the productivity value of each attribute by the number of objects to generate a productivity ranking.

15. A computer-implemented method of managing a collection of objects, the method comprising:
    selecting at least one category for the collection, wherein the range of category constitutes a three-dimensional continuum of meaning defined by the parameters of exemplar, attribute, and broader terms of the category, and each instance of meaning is represented by an exemplar structure comprising:
        (i) an object associated with the category;
        (ii) an exemplar, which is a basic level category term;
        (iii) at least one broader category term attached to the exemplar, which provides context to the exemplar;
        (iv) at least one attribute attached to the exemplar, which is the dimension along which different parameters are recognized as similar; and
        (v) sense assignment that is attached and synonym sets, which are automatically attached, to the at least one attribute when the exemplar structure for the respective meaning instance has been defined;
prototypically categorizing the exemplar structures; and
using the exemplar structures to access information regarding the collection of objects.

16. The method of claim 15, wherein the prototypically categorizing further comprises:
comparing the attributes from at least two of the exemplar structures;
determining matching attributes;
for each matching attribute, increasing a count for each exemplar structure related to the matching attribute; and
ranking the exemplar structures by the value of the count.

17. The method of claim 16, wherein the exemplar structures having the highest count are considered to be the most prototypical.

18. The method of claim 15, further comprising onomasiological salience ranking the exemplar structures by:
identifying a first attribute that is associated with a broader term and at least two exemplars; and
selecting an exemplar, from the at least two exemplars, as best representing the attribute.

19. The method of claim 15, further comprising productivity ranking the attributes by:
counting the number of objects in the collection;
determining, as a productivity value, the number of occurrences of the attribute; and
dividing the productivity value of each attribute by the number of objects to generate a productivity ranking.

20. A computer-implemented method of managing a collection of objects, the method comprising:
(a) selecting a property of the collection of objects;
(b) selecting an object from said collection of objects;
(c) creating at least one exemplar structure for the selected object, said creating comprising:
 (i) first associating an exemplar to the object, said exemplar being an example of the property exhibited by the selected object;
 (ii) second attaching at least one broader term to the exemplar, said broader term providing context to the exemplar as it relates to said property;
 (iii) third attaching at least one attribute to the exemplar, said attribute being a distinguishing feature of the exemplar, each said at least one attribute selected from the group comprising a noun, a verb and an adjective;
 (iv) fourth attaching at least one related word to said at least one attribute, said at least one related word comprising a synonym of the attribute in the context of the exemplar; and
 (v) fifth automatically attaching at least one synonym of the attribute in the context of the attribute;
(d) repeating steps (b) and (c) for each of said objects in said collection of objects;
(e) prototypically categorizing the exemplar structures; and
(f) using the exemplar structures to access information regarding said collection of objects.

21. The method of claim 20, wherein the prototypically categorizing further comprises:
comparing the attributes from at least two of the exemplar structures;
determining matching attributes;
for each matching attribute, increasing a count for each exemplar structure related to the matching attribute; and
ranking the exemplar structures by the value of the count.

22. The method of claim 21, wherein the exemplar structures having the highest count are considered to be the most prototypical.

23. The method of claim 20, further comprising onomasiological salience ranking the exemplar structures by:
identifying a first attribute that is associated with a broader term and at least two exemplars; and
selecting an exemplar, from the at least two exemplars, as best representing the attribute.

24. The method of claim 20, further comprising productivity ranking the attributes by:
counting the number of objects in the collection;
determining, as a productivity value, the number of occurrences of the attribute; and
dividing the productivity value of each attribute by the number of objects to generate a productivity ranking.

* * * * *

UNITED STATES PATENT AND TRADEMARK OFFICE
CERTIFICATE OF CORRECTION

PATENT NO. : 7,197,506 B2 Page 1 of 1
APPLICATION NO. : 10/117773
DATED : March 27, 2007
INVENTOR(S) : Linda Wright It is certified that error appears in the above-identified patent and that said Letters Patent is hereby corrected as shown below:

On the Title Page Item -56-, OTHER PUBLICATIONS, page 1, right column, line 1, before the word "Things", delete "Dangeous" and insert therefor --Dangerous--.

On the Title Page Item -56-, OTHER PUBLICATIONS, page 1, right column, after the line beginning with "WORDNET", insert
--Stuart Kauffman, "System and Method for Infrastructure Design", Oct. 18, 2001, U.S. Patent Application Publication No. US 2001/0032029.
Roland L. Fernandez et al., "Binary Cache File Format for Themeing the Visual Appearance of a Computer System", Apr. 2, 2002, U.S. Patent Application Publication No. US 2002/0039101.--.

At column 11, line 8, after the word "often", delete "then", and insert therefor --than--.

At column 12, line 9, before the word "salience", delete "onomasiological" and insert therefor --Onomasiological--.

At column 15, line 51, after the word "(S-categorization),", delete "ononasio-" and insert therefor --onomasio--.

At column 15, line 65, after the words "on a", delete "the".

At column 16, line 36, after the words "see the", delete "collections" and insert therefor --collection's--.

Signed and Sealed this

Twenty-second Day of July, 2008

JON W. DUDAS
*Director of the United States Patent and Trademark Office*